United States Patent
Nii et al.

(10) Patent No.: US 9,287,934 B2
(45) Date of Patent: Mar. 15, 2016

(54) COMMUNICATION DEVICE AND COMMUNICATION SYSTEM

(71) Applicants: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

(72) Inventors: Kazuhiko Nii, Osaka (JP); Yousuke Takata, Osaka (JP); Takeshi Hagihara, Osaka (JP); Ryou Okada, Osaka (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

(*) Notice: Subject to any disclaimer, the term of this patent is extended or adjusted under 35 U.S.C. 154(b) by 0 days.

(21) Appl. No.: 14/385,405

(22) PCT Filed: Mar. 12, 2013

(86) PCT No.: PCT/JP2013/056701
§ 371 (c)(1),
(2) Date: Sep. 15, 2014

(87) PCT Pub. No.: WO2013/137211
PCT Pub. Date: Sep. 19, 2013

(65) Prior Publication Data
US 2015/0065039 A1 Mar. 5, 2015

(30) Foreign Application Priority Data

Mar. 16, 2012 (JP) .................. 2012-060795
Jun. 27, 2012 (JP) .................. 2012-144499
Feb. 8, 2013 (JP) .................. 2013-023483

(51) Int. Cl.
*H04B 5/00* (2006.01)
*H04B 3/56* (2006.01)
*H01F 38/14* (2006.01)

(52) U.S. Cl.
CPC ............. *H04B 5/0018* (2013.01); *H01F 38/14* (2013.01); *H04B 3/56* (2013.01); H01F 2038/143 (2013.01); *H04B 2203/5491* (2013.01); *Y02B 90/2623* (2013.01); *Y02B 90/2692* (2013.01); *Y02E 60/722* (2013.01); *Y02E 60/7823* (2013.01); *Y02E 60/7892*
(Continued)

(58) Field of Classification Search
CPC ........... H01F 2038/143; H04B 3/56; H04B 2203/5491; H04B 5/0018; Y04S 40/146
USPC ........................................ 455/41.1
See application file for complete search history.

(56) References Cited

U.S. PATENT DOCUMENTS 3,778,759 A * 12/1973 Carroll ................ H04L 25/085
333/12
5,515,038 A * 5/1996 Smith ..................... E21B 47/12
340/853.1

(Continued)

FOREIGN PATENT DOCUMENTS

CN 1841894 A 10/2006
JP 61-136327 A 6/1986

(Continued)

OTHER PUBLICATIONS

Gang-Neng Sung et al., "A PLC Transceiver Design of In-Vehicle Power Line in FlexRay-based Automotive Communication Systems," 2012 IEEE International Conference on Consumer Electronics (ICCE), Jan. 13, 2012, pp. 309-310.

(Continued)

*Primary Examiner* — Eugene Yun
(74) *Attorney, Agent, or Firm* — McDermott Will & Emery LLP

(57) ABSTRACT

When a vehicle including a battery is charged from a power supply device, communication such as power line communication is performed in which a communication signal is superposed on wires contained in a charging cable. A communication device performs communication via a pair of communication lines connected to wires such as a pair of power supply lines used for power supply. A pair of induction elements whose one ends are connected to the pair of communication lines are provided, and the other ends of the pair of induction elements are connected to a ground potential via a capacitance element.

16 Claims, 22 Drawing Sheets

(52) U.S. Cl.
CPC .......... *(2013.01); Y04S 10/14* (2013.01); *Y04S 40/122* (2013.01); *Y04S 40/146* (2013.01)

(56) References Cited

U.S. PATENT DOCUMENTS

| | | | |
|---|---|---|---|
| 2006/0220972 | A1 | 10/2006 | Saitoh |
| 2007/0252664 | A1 | 11/2007 | Saitoh et al. |
| 2013/0154362 | A1 | 6/2013 | Takaka et al. |

FOREIGN PATENT DOCUMENTS

| | | | |
|---|---|---|---|
| JP | 2007-318734 | A | 12/2007 |
| JP | 2008-072301 | A | 3/2008 |
| WO | 2012/032932 | A1 | 3/2012 |

OTHER PUBLICATIONS

"Surface Vehicle Recommended Practice," J1772 Jan. 2010, Society of Automotive Engineers, Inc., Oct. 1996 (revised in Jan. 2010), pp. 1-51.

International Search Report issued in International Application No. PCT/JP2013/056701 mailed Apr. 23, 2013.

Van den Bossche et al., "Trends and Development Status of IEC Global Electric Vehicle Standards," Journal of Asian Electric Vehicles, vol. 8, No. 2, Dec. 2010, pp. 1409-1413.

Extended European Search Report issued in European Application No. 13761229.7 dated Oct. 7, 2015.

Chinese Office Action issued in Chinese Application No. 201380014680.6 dated Aug. 31, 2015, with English translation.

* cited by examiner

COMMUNICATION DEVICE AND COMMUNICATION SYSTEM

RELATED APPLICATIONS

This application is the U.S. National Phase under 35 U.S.C. §371 of International Application No. PCT/JP2013/056701, filed on Mar. 12, 2013, which in turn claims the benefit of Japanese Application No. 2012-060795, filed on Mar. 16, 2012, Japanese Application No. 2012-144499, filed on Jun. 27, 2012 and Japanese Application No. 2013-023483, filed on Feb. 8, 2013, the disclosures of which are incorporated by reference herein.

TECHNICAL FIELD

The present invention relates to: a communication device which performs communication via a pair of communication lines connected to a pair of power supply lines, or a pair of communication lines connected to a grounding line and a control line for transmitting a control signal used for power supply control; and a communication system including the communication device.

BACKGROUND ART

In recent years, electric vehicles and hybrid vehicles are beginning to prevail, which include devices such as motors and batteries, and which travel by driving the motors with power stored in the batteries. The electric vehicles charge their batteries with power supplied from external power supply devices. As for the hybrid vehicles, plug-in hybrid vehicles have been practically used, which allow their batteries to be charged by external power supply devices. The external power supply devices are power supply devices installed in ordinary houses or facilities such as commercial charging stations. When a power supply device supplies power to a vehicle, a plug at an end of a charging cable connected to the power supply device is connected to a power supply port which is provided in the vehicle as a power receiving connector. Then, power is supplied from the power supply device to the vehicle via a power supply line contained in the charging cable, and thereby the battery is charged.

Not only the power supply line but also other lines such as a grounding line, a control line, and the like are contained in the charging cable. The control line is a line used for transmission of a control signal such as a control pilot signal or the like used for power supply control to the power storage device. By transmitting and receiving the control signal between the power supply device and the vehicle via the control line, various states are detected such as the connection state of the charging cable, whether charging is possible or not, the state of charging, and the like, and charging control is performed according to the detected states.

Further, for practical use of vehicles that need external power supply, such as electric vehicles and hybrid vehicles, a communication function is required, which allows a vehicle and a power supply device to transmit and receive information for charging control, and communication information for management of the amount of charge, accounting, or the like.

Thus, standardization of communication such as power line communication has been progressed, in which a communication signal is superposed on a power supply line as a medium to allow communication between a vehicle and a power supply device. Further, the method of transmitting/ receiving a communication signal is not limited to the power line communication, and standardization of communication such as inband communication has also been progressed, in which a communication signal is superposed on a control signal using a control line as a medium so as to be transmitted and received between a vehicle and a power supply device (refer to Non-Patent Literature 1, for example).

In the communications such as the power line communication and the inband communication, a superposition/separation unit using a transformer having a first coil and a second coil is connected to lines such as a power supply line, a grounding line, a control line, and the like. The superposition/ separation unit superposes, on the above lines, a communication signal which is input or output to or from a communication device connected thereto via a communication line, and separates a communication signal from the above lines, whereby a vehicle and a power supply device are allowed to communicate with each other.

The vehicle and the power supply device each includes, for the power line communication or the inband communication, a communication device connected to a pair of power supply lines or to a grounding line and a control line, via a pair of communication lines. Such a communication device is required to have resistance to common mode noise that enters the communication device via the pair of communication lines as differential signal lines. In order to increase the resistance to the common mode noise, for example, a method has been implemented, in which a common mode choke coil for attenuating the common mode noise is interposed in the communication line.

CITATION LIST

Non Patent Literature

NON PATENT LITERATURE 1: "SURFACE VEHICLE RECOMMENDED PRACTICE", J1772 January 2010, Society of Automotive Engineers, Inc. October, 1996 (revised in January, 2010)

SUMMARY OF INVENTION

Technical Problem

However, there are cases where the common mode noise cannot be sufficiently attenuated by the common mode choke coil alone, and therefore, a method for further attenuating the common mode noise has been demanded.

The resistance to the common mode noise can be evaluated by an evaluation test such as BCI (Bulk Current Injection), DPI (Direct Power Injection), induction noise test, or the like.

FIG. 21 is an illustrative diagram showing an example of an evaluation test for common mode noise of a communication device. FIG. 21 shows a system for executing a BCI test as an evaluation test for a communication device 1000 that performs inband communication. The BCI test is an evaluation test of evaluating whether or not a false operation occurs due to abnormality such as communication interruption when noise is applied. As shown in FIG. 21, by using the system for executing the BCI test, influence of common mode noise is evaluated by measuring voltage values in the communication device 1000. As shown in FIG. 21, the communication device 1000 is connected to a grounding line (GND) and a control line (CPLT) via a superposition/separation unit 1100. The superposition/separation unit 1100 and the communication device 1000 are connected to each other via a pair of communication lines such as OFDM (Orthogonal Frequency Division Multiplexing) lines.

In the communication device 1000, a common mode choke coil 1001 is interposed in the pair of communication lines. Via the common mode choke coil 1001, the pair of communication lines branch into a pair of branch lines connected to a transmission side circuit, and a pair of branch lines connected to a reception side circuit. A transmission protection circuit (Tx protection circuit) 1002 is connected as the transmission side circuit. The transmission protection circuit 1002 is connected to an AFE (Analog Front End) circuit 1003 by a pair of connection lines. In addition, as the reception side circuit, a reception protection circuit (Rx protection circuit) 1005 is connected via a bandpass filter (RxBPF) 1004. The reception protection circuit 1005 is connected to the AFE circuit 1003 by a pair of connection lines.

In the evaluation test shown in FIG. 21, the pair of communication lines are inserted in a current probe 2000, and the current probe 2000 is caused to generate pseudo common mode noise. The generated common mode noise enters the AFE circuit 1003 as shown by dashed arrows in FIG. 21. At this time, voltage values (RxIN+ and RxIN−) applied to the pair of connection lines connecting the reception protection circuit 1005 and the AFE circuit 1003 are measured. The measured voltage values are influenced by the common mode noise that enters, and therefore, can be used for evaluation of the influence of the common mode noise.

FIG. 22 is a graph showing an example of a result of the evaluation test for common mode noise. FIG. 22 shows the result of the evaluation test executed by the method shown in FIG. 21, as time-dependent changes of the voltage values (RxIN+ and RxIN−) applied to the pair of connection lines. As shown in FIG. 22, the voltage values having waveforms of the same phase simulate the common mode noise that enters the AFE circuit 1003 and its influence.

Although FIG. 22 shows the result of the evaluation test in the case where the common mode noise is attenuated by the common mode choke coil 1001 shown in FIG. 21, the waveforms in portions enclosed by dashed lines in FIG. 22 are flat in spite of being peak positions. This is caused by an action of a clipping diode incorporated in the reception protection circuit 1005. The clipping diode has a function to suppress the amplitude of a signal that exceeds a predetermined range of clamp levels. Although in FIG. 22 the amplitude of the common mode noise that enters the AFE circuit 1003 in the test is suppressed, if similar common mode noise enters the AFE circuit 1003 at the time of implementation, the communication signal is also suppressed together with the common mode noise. If the communication signal is suppressed, the communication signal partially disappears, which may cause communication abnormality such as communication interruption.

The present invention is made in view of the above situations, and an object of the present invention is to provide a communication device and a communication system capable of attenuating common mode noise by connecting a pair of induction elements to a pair of communication lines.

Solution to Problem

A communication device according to the present invention is a communication device which performs communication via a pair of communication lines connected to a pair of power supply lines used for power supply. The communication device includes a pair of induction elements each having one end connected to each of the pair of communication lines, and the other ends of the pair of induction elements are connected to a reference potential.

A communication device according to the present invention is a communication device which performs communication via a pair of communication lines connected to a control line transmitting a control signal used for power supply control, and to a grounding line. The communication device includes a pair of induction elements each having one end connected to each of the pair of communication lines, and the other ends of the pair of induction elements are connected to a reference potential.

The communication device according to the present invention further includes a transmission side circuit and a reception side circuit each being connected to the pair of communication lines via a pair of branch lines. The pair of induction elements are connected to the pair of communication lines via the pair of branch lines connected to the reception side circuit.

The communication device according to the present invention further includes a capacitance element interposed between the other ends of the pair of induction elements and the reference potential.

The communication device according to the present invention further includes a capacitance element interposed in at least one of two lines between the pair of communication lines and the one ends of the pair of induction elements.

In the communication device according to the present invention, the pair of induction elements are a pair of coils having substantially the same number of turns (having the same number of turns).

In the communication device according to the present invention, a superposition/separation unit which superposes and separates a communication signal via the pair of communication lines, is connectable.

In the communication device according to the present invention, the pair of communication lines is a twisted pair wire.

A communication system according to the present invention is a communication system in which a power supply device is connected to a vehicle via a pair of power supply lines used for power supply, the vehicle having a communication function and including a power storage device supplied with power from the power supply device, and a communication signal is transmitted and received using the power supply line as a medium. At least one of the power supply device and the vehicle includes the above-mentioned communication device, and the communication device is connected to the pair of power supply lines via a pair of communication lines.

A communication system according to the present invention is a communication system including a power supply device, and a vehicle having a communication function and including a power storage device supplied with power from the power supply device, in which a communication signal different from a control signal used for power supply control is transmitted and received using, as media, a control line for transmitting the control signal, and a grounding line. At least one of the power supply device and the vehicle includes the above-mentioned communication device, and the communication device is connected to the control line and the grounding line via a pair of communication lines.

In the present invention, by providing the pair of induction elements that cause common mode noise to flow toward the reference potential side, the common mode noise can be attenuated.

Advantageous Effects of Invention

In the communication device and the communication system according to the present invention, since common mode noise can be attenuated by the pair of induction elements, advantageous effects can be achieved, such as increased resistance to the common mode noise.

DESCRIPTION OF EMBODIMENTS

Hereinafter, the present invention will be described in detail with reference to the drawings showing embodiments thereof.

Embodiment 1

Figure 1:
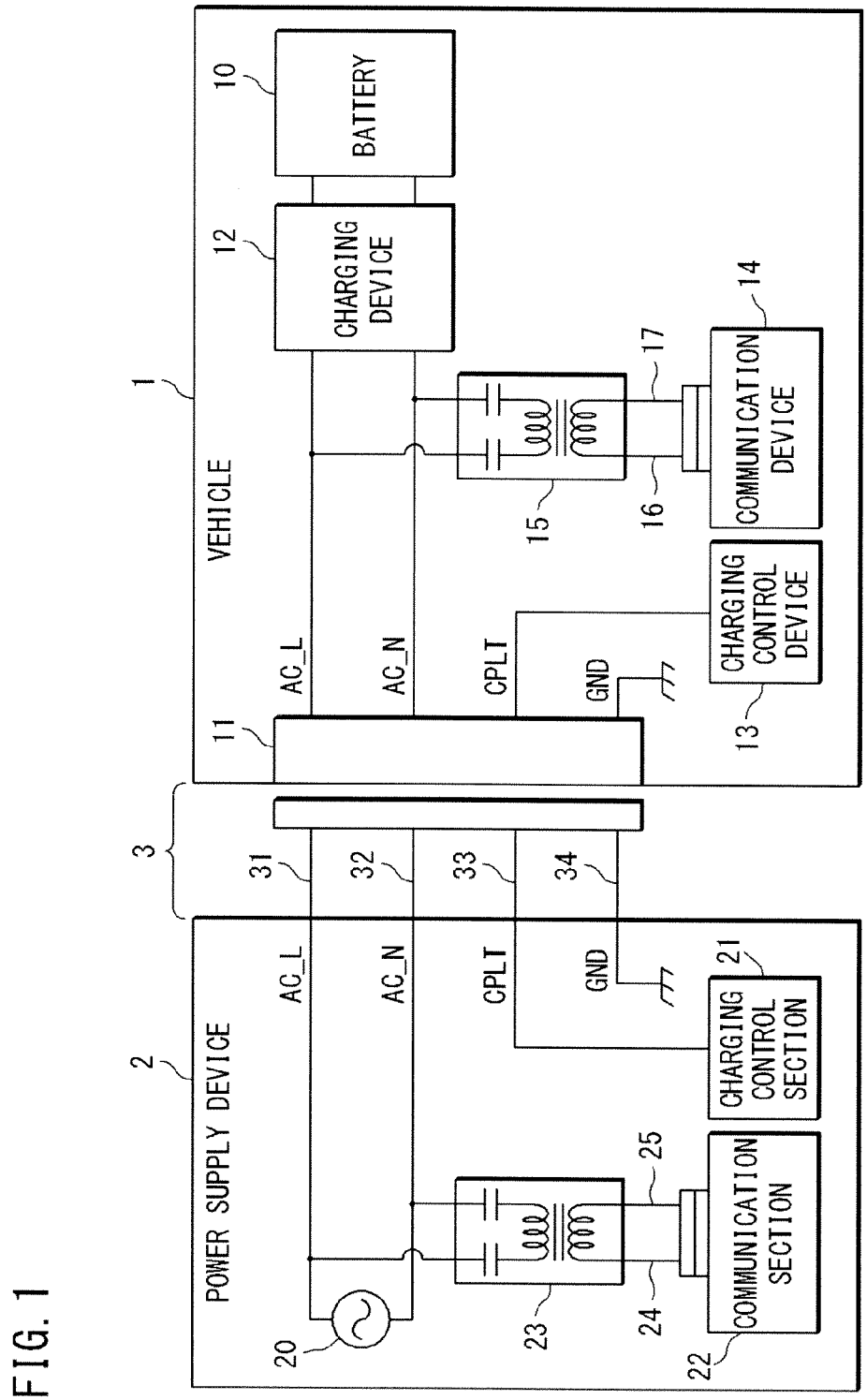
FIG. 1 is an illustrative diagram showing an exemplary configuration of a communication system according to Embodiment 1 of the present invention.

FIG. 1 is an illustrative diagram showing an exemplary configuration of a communication system according to Embodiment 1 of the present invention. FIG. 1 shows an example in which the present invention is applied to a mode where a battery (power storage device) 10 included in a vehicle 1 such as an electric vehicle, a plug-in hybrid vehicle, or the like is supplied with power from a power supply device 2 such as a charging stand or the like.

The vehicle 1 and the power supply device 2 can be connected to each other by a charging cable 3. The charging cable 3 contains a pair of power supply lines 31 and 32 used for power supply, a control line 33 that transmits a control signal such as a control pilot signal (CPLT) used for charging control, and a grounding line 34 as a conducting line for grounding. An end of the charging cable 3 is connected to the power supply device 2 side, and the other end thereof can be connected to a power receiving connector 11 provided as an in-vehicle power supply port on the vehicle 1 side. When the other end of the charging cable 3 is connected to the power receiving connector 11, the circuit structure exemplarily shown in FIG. 1 is realized.

The power supply lines 31 and 32 are AC lines to which AC voltage is applied. The control line 33 is a signal line through which a control signal such as a control pilot signal is transmitted and received, and charging control is performed based on a control pilot signal that is transmitted and received when the power supply device 2 and a charging control device 13 are connected to each other. In addition, the power supply lines 31 and 32 can be used as media for transmitting information for performing management such as vehicle authentication, charging management, accounting management, or the like, and other various kinds of information. That is, the vehicle 1 can communicate with the power supply device 2 by superposing and separating a communication signal on and from the power supply lines 31 and 32.

The power supply device 2 includes a power supply section 20 that supplies AC power, a charging control section 21 that performs communication relating to charging control, a communication section (communication device) 22 that performs input and output of a communication signal, and a superposition/separation section 23 that superposes and separates, on and from the power supply lines 31 and 32, a communication signal input to and output from the communication section 22.

One ends of the power supply lines 31 and 32 are connected to the power supply section 20. One end of the control line 33 is connected to the charging control section 21. Lines inside the power supply device 2 are internal conducting lines that act as extended lines connected to the power supply lines 31 and 32, the control line 33, and the grounding line 34 which are contained in the charging cable 3 provided outside the power supply device 2. However, in the following description, for convenience sake, the lines inside the power supply device 2, including the extended line portions provided as the internal conducting lines, will be described as the power supply lines 31 and 32, the control line 33, and the grounding line 34.

The charging control section 21 is, for example, an output-side circuit complying with the international standard relating to charging control, and performs charging control in various states such as confirmation of connection, start of energization, and the like by transmitting and receiving a control signal such as a control pilot signal.

The communication section 22 is a communication device that performs communication by transmitting and receiving a communication signal via a pair of communication lines 24 and 25 connected to the pair of power supply lines 31 and 32. The superposition/separation section 23 is interposed in the pair of communication lines 24 and 25.

The superposition/separation section 23 is configured using a circuit such as a coupling transformer (a circuit such as an electromagnetic guidance type signal converter) and an element such as a capacitor. The coupling transformer includes a first coil having both ends connected to the communication lines 24 and 25 on the power supply lines 31 and 32 side via capacitors, and a second coil electromagnetically coupled to the first coil and having both ends connected to the communication lines 24 and 25 on the communication section 22 side. The capacitors present a high impedance to the AC power supplied through the power supply lines 31 and 32, and a low impedance to a communication signal using a frequency band for low-speed communication ranging from several tens of kHz to several hundreds of kHz, or a frequency band for high-speed communication ranging from several MHz to several tens of MHz. That is, the capacitors, in the transmission paths branching from the power supply lines 31 and 32, transmit signals in the frequency band used for the communication signal, and block signals in the frequency band used for the AC power.

When the superposition/separation section 23 superposes various communication signals output from the communication section 22 on the power supply lines 31 and 32 through the communication lines 24 and 25, and inputs various communication signals separated from the power supply lines 31 and 32 into the communication section 22, power line communication using the power supply lines 31 and 32 as media is performed. That is, although the power supply device 2 includes a communication device as the communication section 22, the power supply device 2 can be also regarded as a communication device that performs power line communication by itself.

The vehicle 1 includes, in addition to the battery 10 and the power receiving connector 11, a charging device 12 that charges the battery 10, the charging control device 13 that performs communication relating to charging control, a communication device 14 that transmits and receives a communication signal, and a superposition/separation unit 15 that superposes and separates a communication signal on and from the pair of power supply lines 31 and 32.

In the vehicle 1, in-vehicle lines connected to the power supply lines 31 and 32, the control line 33, and the grounding line 34 are provided. The in-vehicle lines connected to the power supply lines 31 and 32 are AC lines connected to the charging device 12, and the battery 10 is charged by the charging device 12. The in-vehicle line connected to the control line 33 is connected to the charging control device 13 via an extended line. The in-vehicle line connected to the grounding line 34 is earthed through the vehicle body. In the following description, for convenience sake, the respective in-vehicle lines, including the AC lines and the extended lines, will be described as the power supply lines 31 and 32, the control line 33, and the grounding line 34 in cases where it is not necessary to distinguish them.

The charging control device 13 is, for example, an input side circuit complying with the international standard relating to charging control, and performs charging control in various states such as confirmation of connection, start of energization, and the like, by transmitting and receiving a control signal such as a control pilot signal.

The communication device 14 is a device that performs communication by transmitting and receiving a communication signal via a pair of communication lines 16 and 17 connected to the pair of power supply lines 31 and 32. The superposition/separation unit 15 is interposed in the pair of communication lines 16 and 17.

The superposition/separation unit 15 is configured using a circuit such as a coupling transformer and an element such as a capacitor. The coupling transformer includes a first coil having both ends connected to the communication lines 16 and 17 on the power supply lines 31 and 32 side via capacitors, and a second coil electromagnetically coupled to the first coil and having both ends connected to the communication lines 16 and 17 on the communication device 14 side. The capacitors present a high impedance to the AC power supplied through the power supply lines 31 and 32, and a low impedance to a communication signal using a frequency band for low-speed communication ranging from several tens of kHz to several hundreds of kHz, or a frequency band for high-speed communication ranging from several MHz to several tens of MHz. That is, the capacitors, in the transmission paths branching from the power supply lines 31 and 32, transmit signals in the frequency band used for the communication signal, and block signals in the frequency band used for the AC power.

When the superposition/separation unit 15 superposes various communication signals output from the communication device 14 on the power supply lines 31 and 32 through the communication lines 16 and 17, and inputs various communication signals separated from the power supply lines 31 and 32 to the communication device 14, power line communication using the power supply lines 31 and 32 as media is performed.

In the exemplary configuration shown in FIG. 1, a loop circuit for transmitting a communication signal is formed by the superposition/separation unit 15, the communication lines 16 and 17, the power supply lines 31 and 32, the communication lines 24 and 25, the superposition/separation section 23, and other lines, elements, and circuits. Thereby, power line communication in which a communication signal is superposed on the power supply lines 31 and 32 can be realized between the communication device 14 in the vehicle 1 and the communication section 22 in the power supply device 2.

Figure 2:
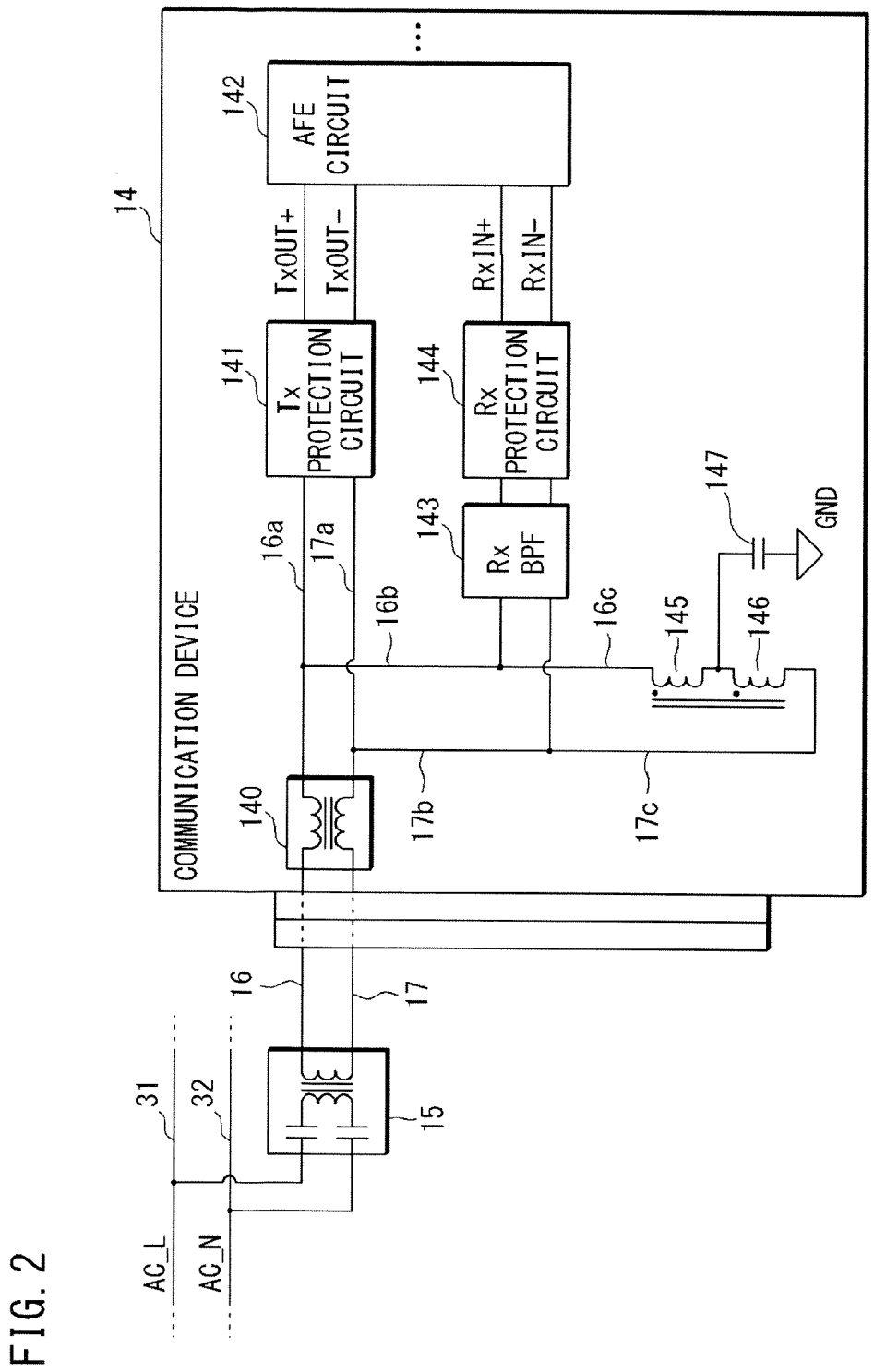
FIG. 2 is a block diagram showing an exemplary configuration of a communication device of a vehicle used in the communication system according to Embodiment 1 of the present invention.

FIG. 2 is a block diagram showing an exemplary configuration of the communication device 14 of the vehicle 1 used in the communication system according to Embodiment 1 of the present invention. As shown in FIG. 2, the communication device 14 is connected to the pair of communication lines 16 and 17 connected to the pair of power supply lines 31 and 32. The communication device 14 included in the vehicle 1 is a device that performs communication by transmitting and receiving a communication signal via the pair of communication lines 16 and 17 connected to the pair of power supply lines 31 and 32, the superposition/separation unit 15 is interposed in the pair of the communication lines 16 and 17, and the communication lines 16 and 17 connecting the superposition/separation unit 15 and the communication device 14 are used as OFDM (Orthogonal Frequency Division Multiplexing) lines.

In the communication device 14, a common mode choke coil 140 is interposed in the pair of communication lines 16 and 17. The common mode choke coil 140 has a function of attenuating common mode noise that enters inside the communication device 14, and a function of attenuating common mode noise that goes out of the communication device 14. The communication device 14 of the present invention has a function of further suppressing common mode noise that has not been suppressed by the common mode choke coil 140 and entered inside the communication device 14.

The pair of communication lines 16 and 17, via the common mode choke coil 140, branch into a pair of branch lines 16a and 17a connected to the transmission side circuit, and a pair of branch lines 16b and 17b connected to the reception side circuit.

As the transmission side circuit, a transmission protection circuit (Tx protection circuit) 141 is connected, and the transmission protection circuit 141 is connected to an AFE (Analog Front End) circuit 142 by a pair of connection lines. As the reception side circuit, a reception protection circuit (Rx protection circuit) 144 is connected via a bandpass filter (Rx-BPF) 143, and the reception protection circuit 144 is connected to the AFE circuit 142 by a pair of connection lines.

A pair of branch lines 16c and 17c connected to a ground potential are further branched from the middle of the pair of branch lines 16b and 17b connected to the reception side circuit. One ends of a pair of induction elements 145 and 146 are connected to the pair of branch lines 16c and 17c on the ground potential side, and the other ends of the pair of induction elements 145 and 146 are connected to the ground potential via a capacitance element 147 such as a capacitor. By interposing the capacitance element 147 between the pair of induction elements 145 and 146 and the ground potential, ground fault is avoided. As an example of the pair of induction elements 145 and 146, inductors such as a pair of coils having substantially the same number of turns (having the same number of turns) are adopted.

In the example shown in FIG. 2, one ends of the pair of induction elements 145 and 146 composed of a pair of coils having substantially the same number of turns are connected to the pair of branch lines 16c and 17c, and the other ends thereof are connected to each other. One end of the capacitance element 147 such as a capacitor is connected to a connection point to which the other ends of the pair of induction terminals 145 and 146 are connected, and the other end of the capacitance element 147 is connected to the vehicle body as a ground potential. Grounding may be performed through a part other than the vehicle body, and a potential other than the ground potential may be used as a reference potential.

By grounding the pair of induction elements 145 and 146 such as a pair of coils having substantially the same number of turns, the common impedance to the common mode noise is reduced. Thus, the common mode noise flows toward the ground side, and is not likely to enter the reception side circuit. In addition, since the pair of induction elements 145 and 146 has a high impedance to the communication signal in the normal mode, a differential impedance relating to the pair of branch lines 16b and 17b connected to the reception side circuit is kept to be relatively low. Therefore, the communication signal in the normal mode does not flow toward the pair of induction elements 145 and 146, but is input to the reception side circuit. Accordingly, the communication signal and the common mode noise can be separated from each other, and the common mode noise that enters the reception side circuit can be attenuated.

Figure 3:
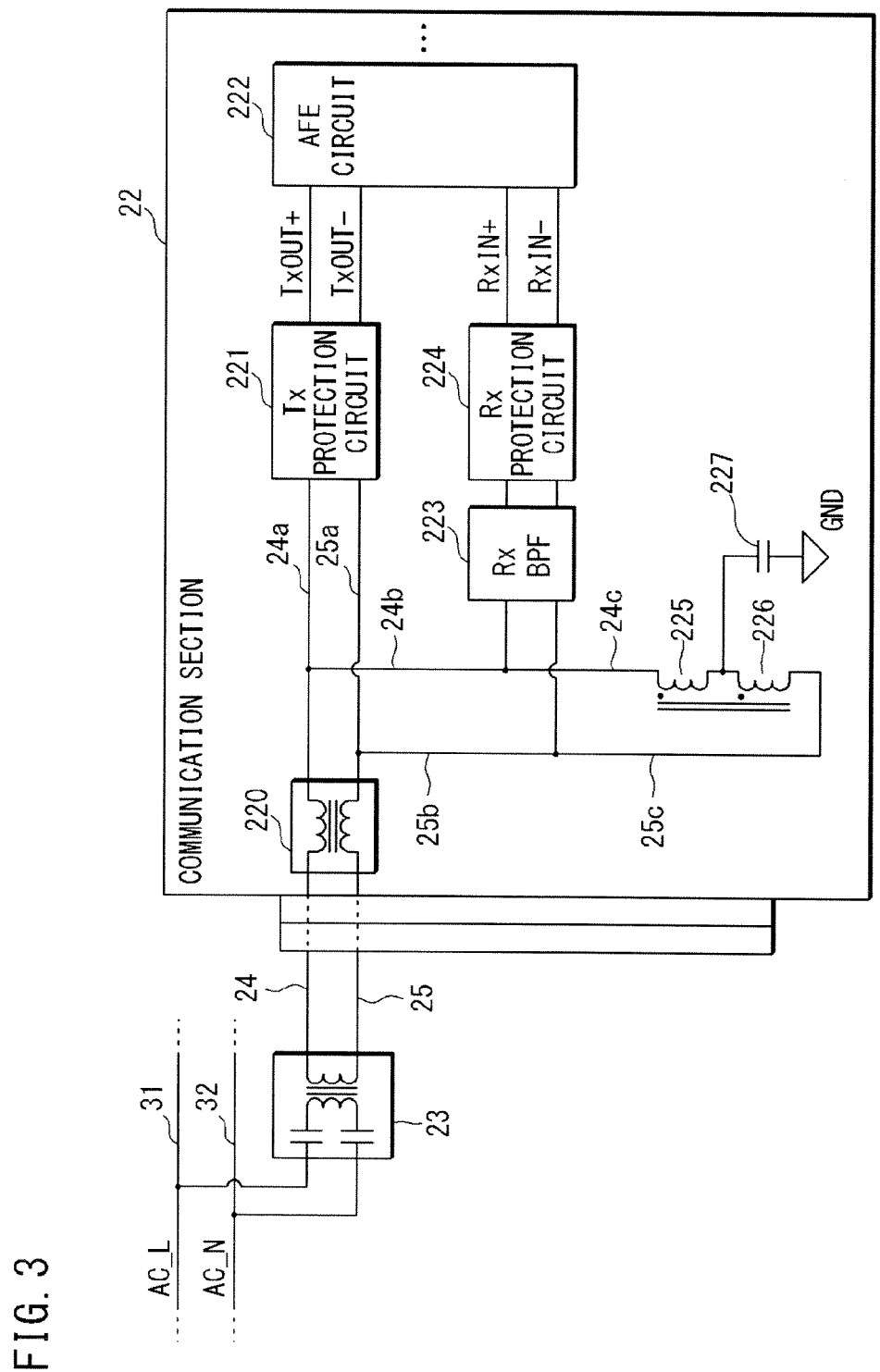
FIG. 3 is a block diagram showing an exemplary configuration of a communication section of a power supply device used in the communication system according to Embodiment 1 of the present invention.

FIG. 3 is a block diagram showing an exemplary configuration of the communication section 22 of the power supply device 2 used in the communication system according to Embodiment 1 of the present invention. As shown in FIG. 3, the communication section 22 is connected to the pair of communication lines 24 and 25 connected to the pair of power supply lines 31 and 32. The communication section 22 included in the power supply device 2 is a device that performs communication by transmitting and receiving a communication signal via the pair of communication lines 24 and 25 connected to the pair of power supply lines 31 and 32. The superposition/separation section 23 is interposed in the pair of communication lines 24 and 25.

In the communication section 22, the pair of communication lines 24 and 25, via a common mode choke coil 220, branch into a pair of branch lines 24a and 25a connected to the transmission side circuit, and a pair of branch lines 24b and 25b connected to the reception side circuit.

As the transmission side circuit, a transmission protection circuit (Tx protection circuit) 221 is connected, and the transmission protection circuit 221 is connected to an AFE circuit 222 by a pair of connection lines. As the reception side circuit, a reception protection circuit (Rx protection circuit) 224 is connected via a bandpass filter (RxBPF) 223, and the reception protection circuit 224 is connected to the AFE circuit 222 by a pair of connection lines.

A pair of branch lines 24c and 25c are branched from the middle of the pair of branch lines 24h and 25h connected to the reception side circuit. One ends of a pair of induction elements 225 and 226 are connected to the pair of branch lines 24c and 25c, and the other ends of the pair of induction elements 225 and 226 are connected to a ground potential via a capacitance element 227.

Since the components of the communication section 22 are substantially identical to those of the communication device 14 described with reference to FIG. 2, detailed description thereof will be omitted.

In FIGS. 1 to 3, the configuration has been described, in which the superposition/separation unit 15 and the superposition/separation section 23 are provided outside the communication device 14 of the vehicle 1 and the communication section 22 of the power supply device 2, respectively. However, the superposition/separation unit 15 and the superposition/separation section 23 may be provided inside the communication device 14 and the communication section 22, respectively. Hereinafter, as a modification of Embodiment 1, the configuration will be described, in which the superposition/separation unit 15 and the superposition/separation section 23 are provided inside the communication device 14 and the communication section 22, respectively.

Figure 4:
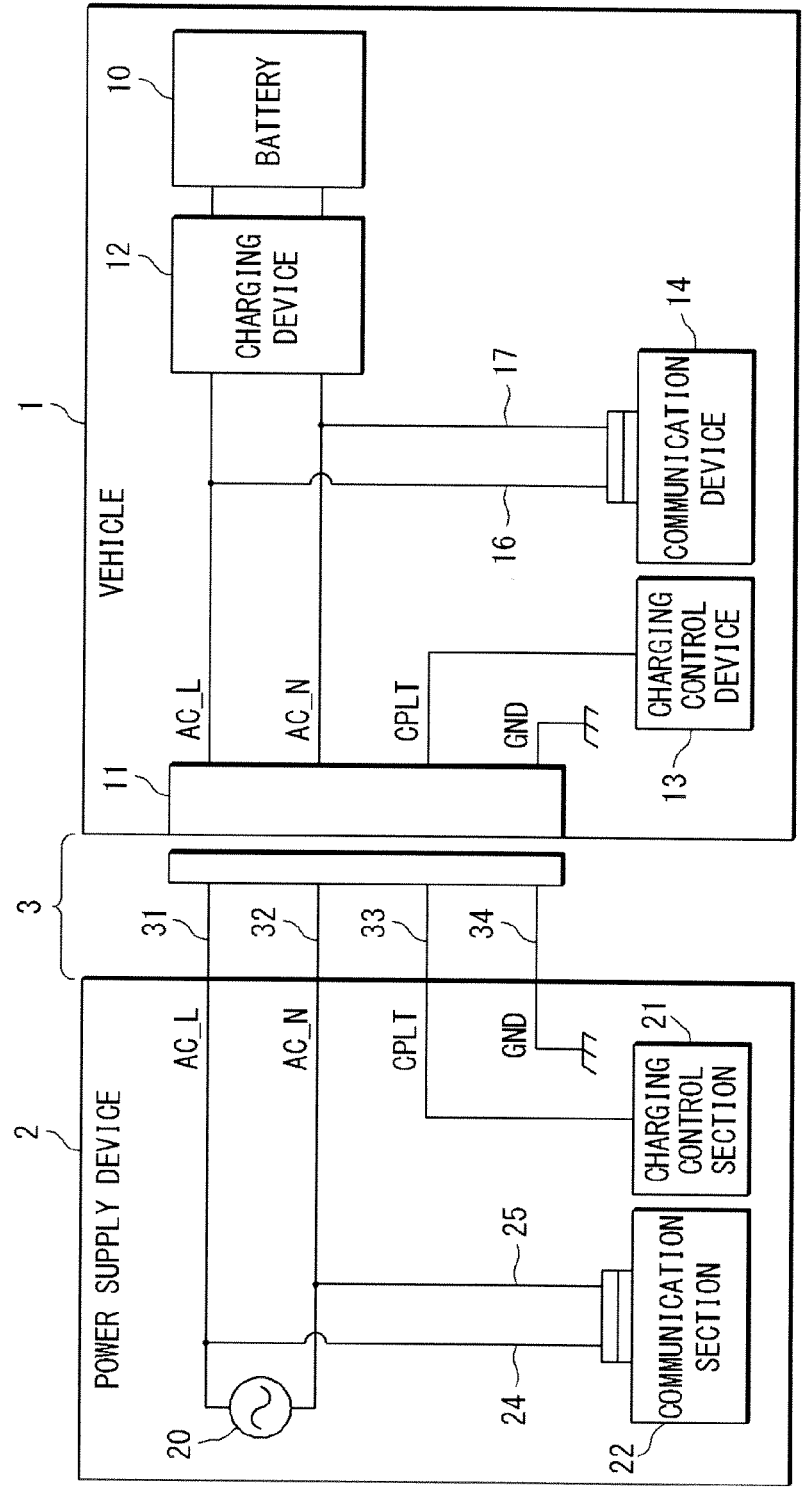
FIG. 4 is an illustrative diagram showing a modification of the communication system according to Embodiment 1.

FIG. 4 is an illustrative diagram showing a modification of the communication system according to Embodiment 1. In FIG. 4, the same components as those shown in FIG. 1 are denoted by the same reference numerals, and detailed description thereof will be omitted.

In the modification shown in FIG. 4, superposition of various communication signals on the power supply lines 31 and 32 and separation of superposed various communication signals from the power supply lines 31 and 32 are performed in the communication device 14 and the communication section 22. Therefore, the vehicle 1 has the superposition/separation unit 15 provided in the communication device 14 (refer to FIG. 5), and the power supply device 2 has the superposition/ separation section 23 provided in the communication section 22 (refer to FIG. 6).

Figure 5:
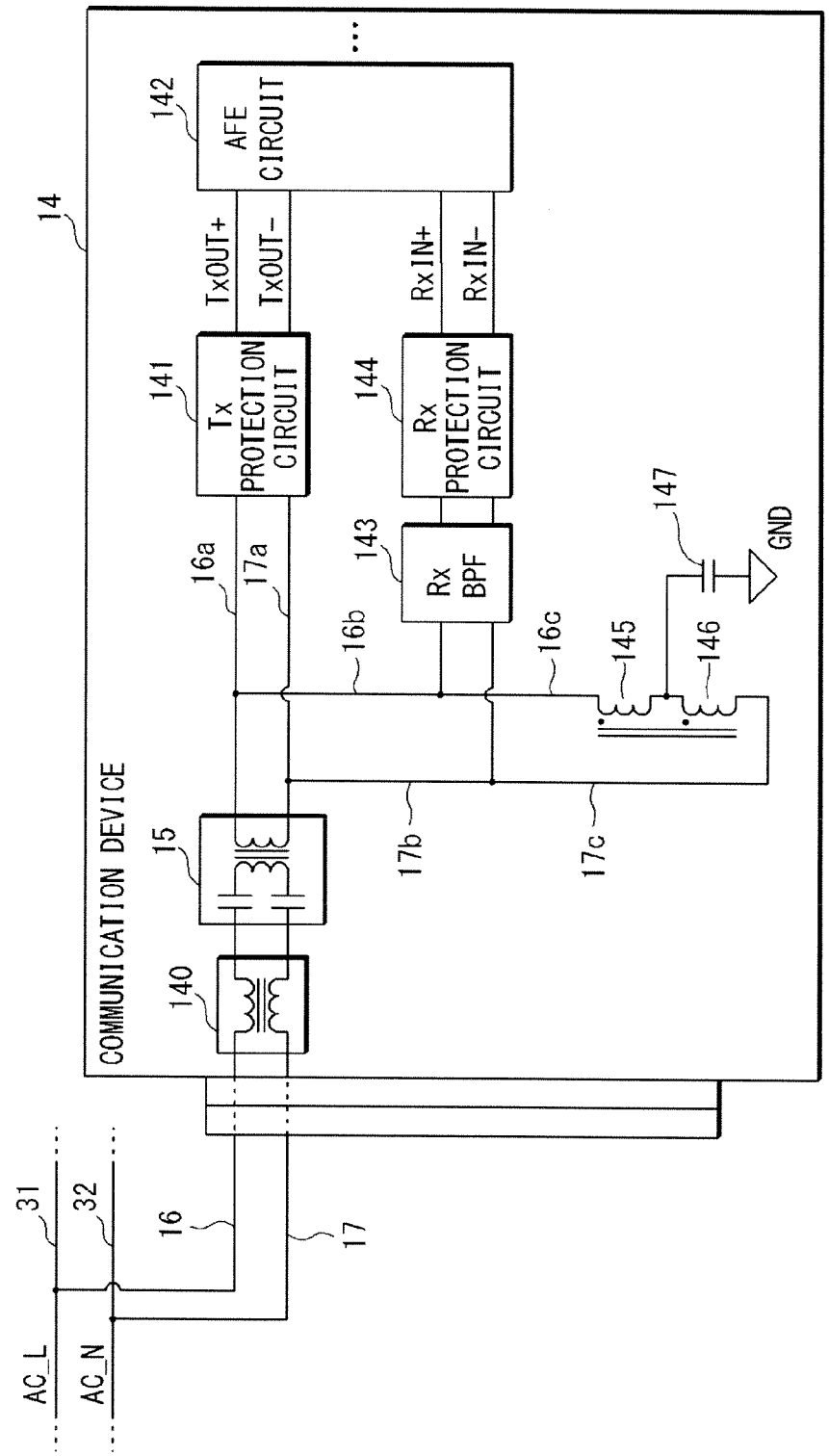
FIG. 5 is a block diagram showing an exemplary configuration of a communication device in the communication system shown in FIG. 4.

FIG. 5 is a block diagram showing an exemplary configuration of the communication device 14 in the communication system shown in FIG. 4. The components shown in FIG. 5 have the same functions as those of the components shown in FIG. 2, and therefore, will be described with the same reference numerals as those shown in FIG. 2 being assigned thereto.

As one of the features of the exemplary configuration shown in FIG. 5, the superposition/separation unit 15 is provided inside the communication device 14. The superposition/separation unit 15 is configured using a circuit such as a coupling transformer and an element such as a capacitor. The coupling transformer includes a first coil connected to the common mode choke coil 140 side via capacitors, and a second coil electromagnetically coupled to the first coil and connected to the transmission protection circuit 141 via the branch lines 16a and 17a. As described above, the capacitors included in the superposition/separation unit 15 transmit signals in the frequency band used for the communication signal, and block signals in the frequency hand used for the AC power.

The superposition/separation unit 15 superposes various communication signals output from the transmission protection circuit 141 on the power supply lines 31 and 32 through the communication lines 16 and 17, and inputs various communication signals separated from the power supply lines 31 and 32 to the reception protection circuit 144 via the bandpass filter 143. This configuration allows the communication device 14 to realize power line communication with the power supply device 2 by using the power supply lines 31 and 32 as media.

Figure 6:
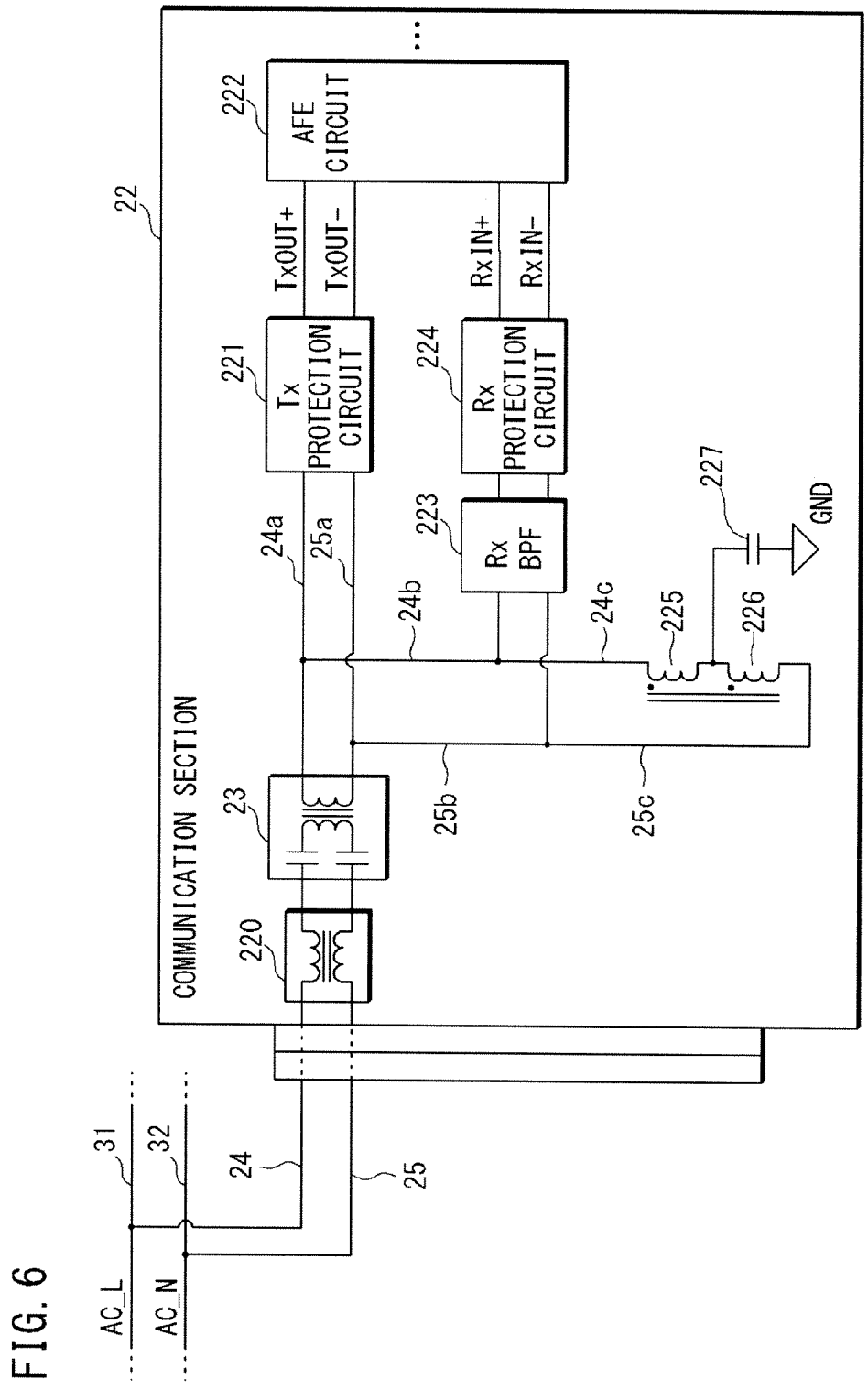
FIG. 6 is a block diagram showing an exemplary configuration of a communication section in the communication system shown in FIG. 4.

FIG. 6 is a block diagram showing an exemplary configuration of the communication section 22 in the communication system shown in FIG. 4. The components shown in FIG. 6 have the same functions as those of the components shown in FIG. 3, and therefore, will be described with the same reference numerals as those shown in FIG. 3 being assigned thereto.

As one of the features of the exemplary configuration shown in FIG. 6, the superposition/separation section 23 is provided inside the communication section 22. The superposition/separation section 23 is configured using a circuit such as a coupling transformer and an element such as a capacitor. The coupling transformer includes a first coil connected to the common mode choke coil 220 side via capacitors, and a second coil electromagnetically coupled to the first coil and connected to the transmission protection circuit 221 via the branch lines 24a and 25a. As described above, the capacitors included in the superposition/separation section 23 transmit signals in the frequency band used for the communication signal, and block signals in the frequency hand used for the AC power.

The superposition/separation section 23 superposes various communication signals output from the transmission protection circuit 221 on the power supply lines 31 and 32 through the communication lines 24 and 25, and inputs various communication signals separated from the power supply lines 31 and 32 to the reception protection circuit 224 via the bandpass filter 223. This configuration allows the communication section 22 to realize power line communication with the vehicle 1 by using the power supply lines 31 and 32 as media.

In the modifications shown in FIGS. 4 to 6, since the common mode noise can be attenuated also by the coupling transformers of the superposition/separation unit 15 and the superposition/separation section 23, the resistance to the common mode noise can be further increased.

In addition, since conversion of the common mode noise outside the communication device 14 (communication section 22) into normal mode noise can be suppressed by enhancing the balancing of the communication lines 16 and 17 (communication lines 24 and 25), the effect of the present invention can be more enhanced. As an exemplary configuration of the communication lines 16 and 17 (communication lines 24 and 25), a twisted pair wire, two parallel wires, coaxial wires, or the like may be adopted. In order to enhance the balancing, a twisted pair wire is most preferable.

Embodiment 2

In Embodiment 2, the configuration of Embodiment 1 is applied to a communication system relating to inband communication. In the following description, the same components as those of Embodiment 1 are denoted by the same reference numerals as those of Embodiment 1, and detailed description thereof will be omitted on assumption that the description of Embodiment 1 is referred to.

Figure 7:
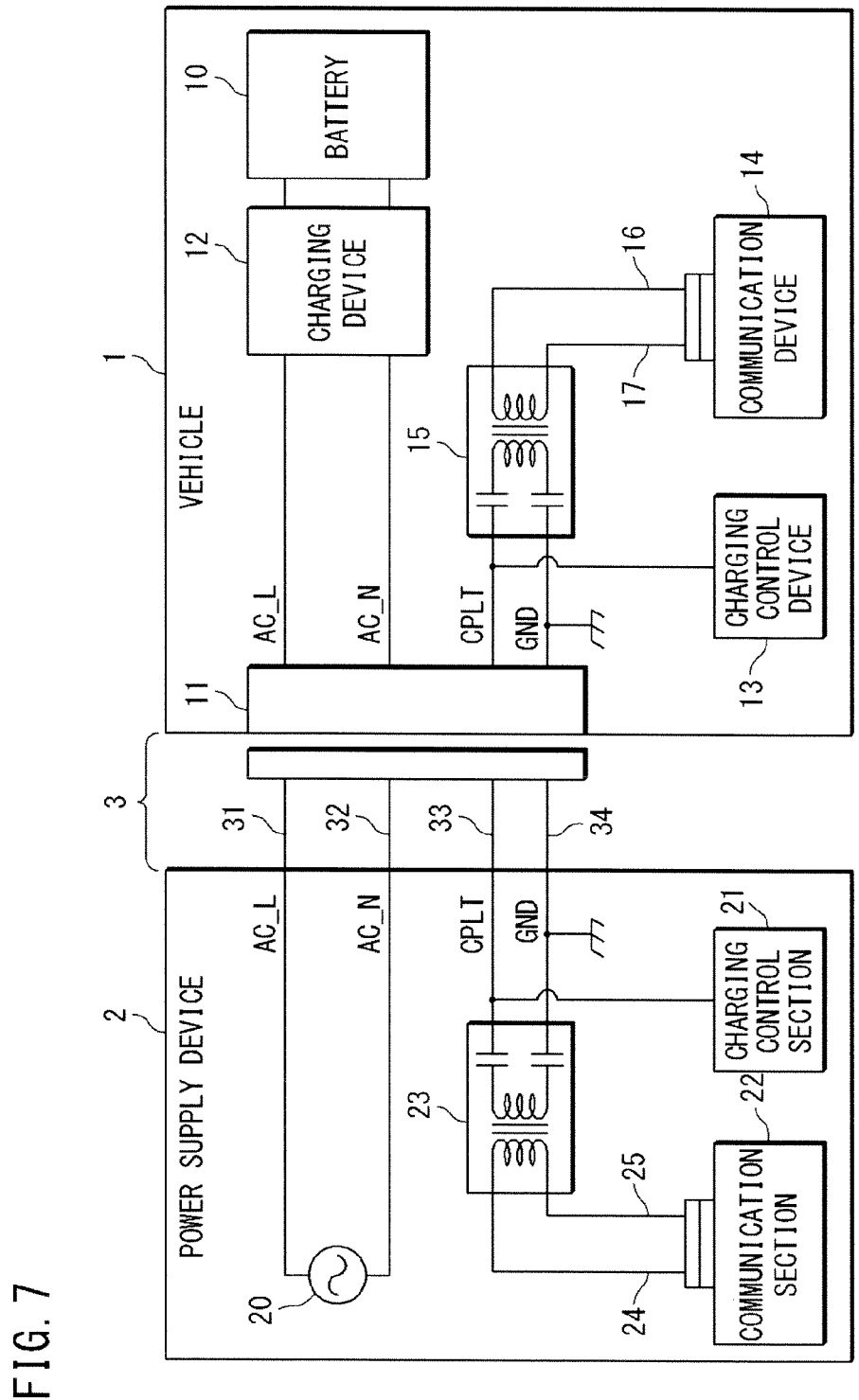
FIG. 7 is an illustrative diagram showing an exemplary configuration of a communication system according to Embodiment 2 of the present invention.

FIG. 7 is an illustrative diagram showing an exemplary configuration of a communication system according to Embodiment 2 of the present invention. In Embodiment 2, the communication section 22 included in the power supply device 2 is a communication device that performs communication by transmitting and receiving a communication signal via the pair of communication lines 24 and 25 connected to the control line 33 and the grounding line 34. The superposition/separation section 23 is interposed in the pair of communication lines 24 and 25.

When the superposition/separation section 23 superposes various communication signals output from the communication section 22 on the control line 33 and the grounding line 34 through the communication lines 24 and 25, and inputs various communication signals separated from the control line 33 and the grounding line 34 to the communication section 22, inband communication using the control line 33 and the grounding line 34 as media is performed. That is, although the power supply device 2 includes a communication device as the communication section 22, the power supply device 2 also acts as a communication device that performs power line communication by itself.

The communication device 14 included in the vehicle 1 is a device that performs communication by transmitting and receiving a communication signal via the pair of communication lines 16 and 17 connected to the control line 33 and the grounding line 34. The superposition/separation unit 15 is interposed in the pair of communication lines 16 and 17.

When the superposition/separation unit 5 superposes various communication signals output from the communication device 14 on the control line 33 and the grounding line 34 through the communication lines 16 and 17, and inputs various communication signals separated from the control line 33 and the grounding line 34 to the communication device 14, inband communication using the control line 33 and the grounding line 34 as media is performed.

In Embodiment 2, a loop circuit for transmitting a communication signal is formed by the superposition/separation unit 15, the communication lines 16 and 17, the control line 33, the grounding line 34, the communication lines 24 and 25, the superposition/separation section 23, and other lines, elements, and circuits. Thereby, inband communication in which a communication signal is superposed on the control line 33 and the grounding line 34 can be realized between the communication device 14 in the vehicle 1 and the communication section 22 in the power supply device 2.

Figure 8:
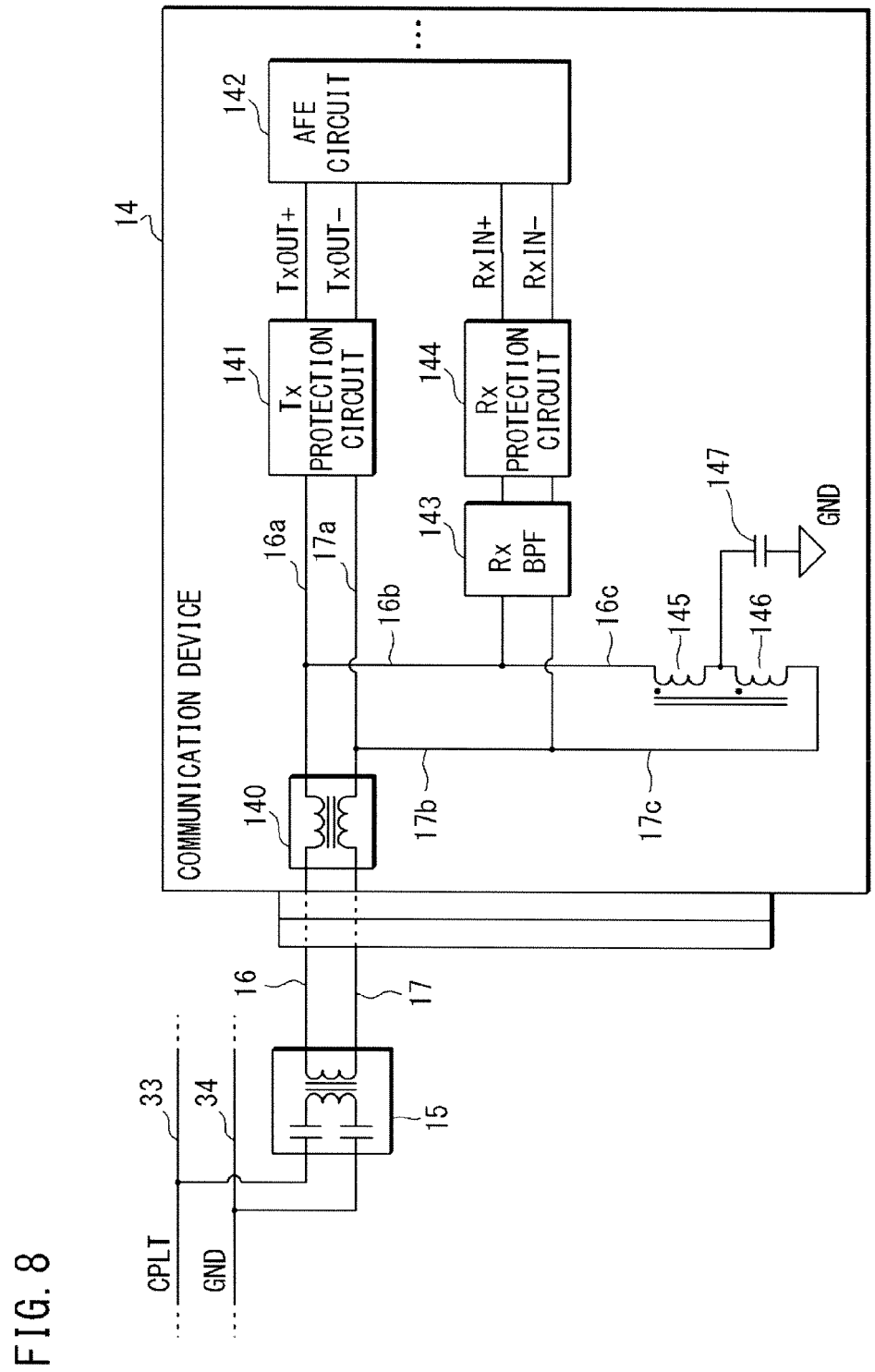
FIG. 8 is a block diagram showing an exemplary configuration of a communication device of a vehicle used in the communication system according to Embodiment 2 of the present invention.

FIG. 8 is a block diagram showing an exemplary configuration of the communication device 14 of the vehicle 1 used in the communication system according to Embodiment 2 of the present invention. As shown in FIG. 8, the communication device 14 is connected to the pair of communication lines 16 and 17 connected to the control line 33 and the grounding line 34. The communication device 14 included in the vehicle 1 is a device that performs communication by transmitting and receiving a communication signal via the pair of communication lines 16 and 17 connected to the control line 33 and the grounding line 34. The superposition/separation unit 15 is interposed in the pair of communication lines 16 and 17.

Since the internal configuration of the communication device 14 used in the communication system according to the Embodiment 2 is identical to that of the communication device 14 according to Embodiment 1, detailed description thereof will be omitted on assumption that the description of Embodiment 1 is referred to.

Figure 9:
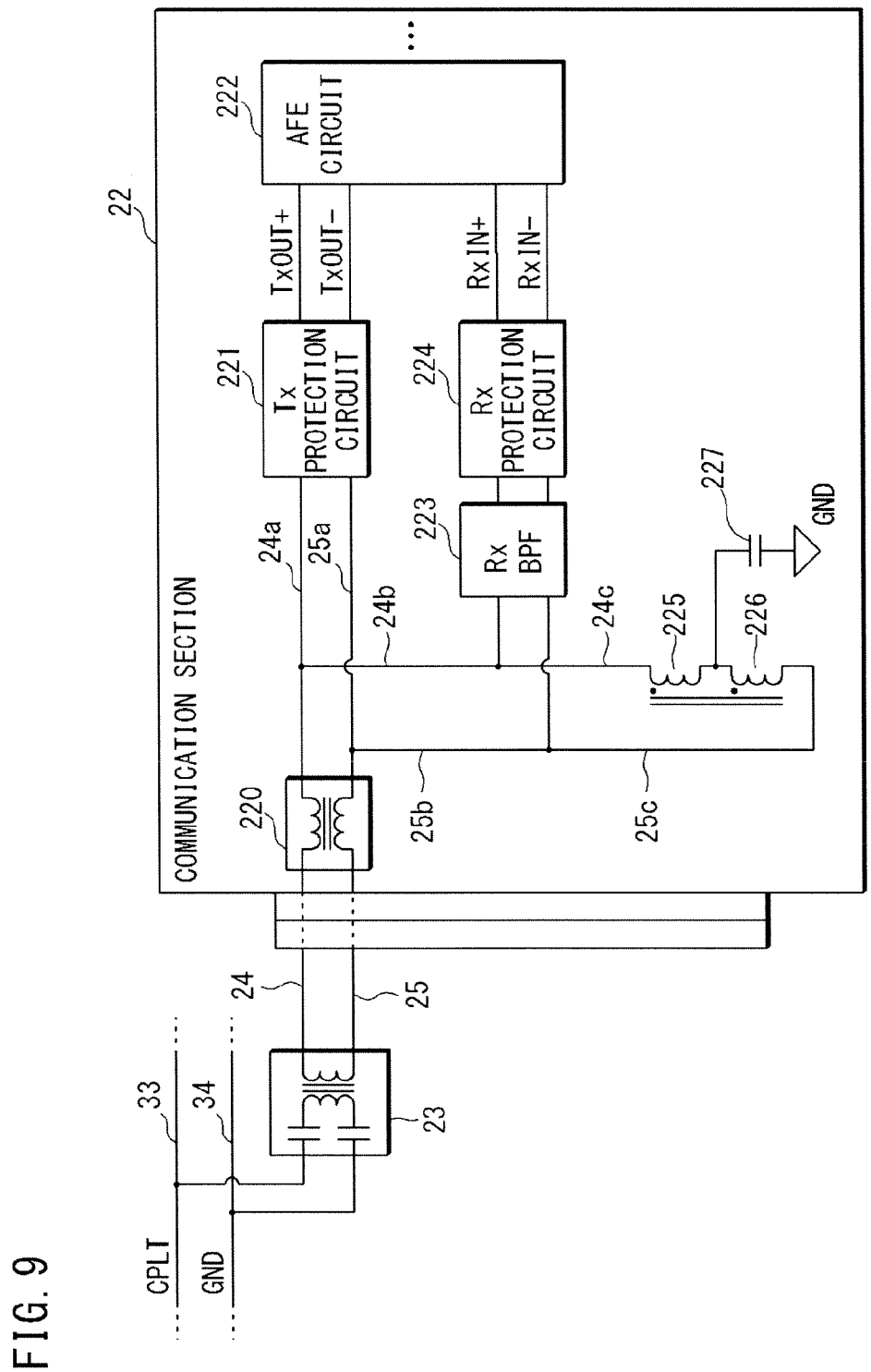
FIG. 9 is a block diagram showing an exemplary configuration of a communication section of a power supply device used in the communication system according to Embodiment 2 of the present invention.

FIG. 9 is a block diagram showing an exemplary configuration of the communication section 22 of the power supply device 2 used in the communication system according to Embodiment 2 of the present invention. As shown in FIG. 9, the communication section 22 is connected to the pair of communication lines 24 and 25 connected to the control line 33 and the grounding line 34. The communication section 22 included in the power supply device 2 is a device that performs communication by transmitting and receiving a communication signal via the pair of communication lines 24 and 25 connected to the control line 33 and the grounding line 34. The superposition/separation section 23 is interposed in the pair of communication lines 24 and 25.

Since the internal configuration of the communication section 22 used in the communication system according to the Embodiment 2 is identical to that of the communication section 22 according to Embodiment 1, detailed description thereof will be omitted on assumption that the description of Embodiment 1 is referred to.

In FIGS. 7 to 9, the configuration has been described, in which the superposition/separation unit 15 and the superposition/separation section 23 are provided outside the communication device 14 of the vehicle 1 and the communication section 22 of the power supply device 2, respectively. However, the superposition/separation unit 15 and the superposition/separation section 23 may be provided inside the communication device 14 and the communication section 22, respectively. Hereinafter, as a modification of Embodiment 2, the configuration will be described, in which the superposition/separation unit 15 and the superposition/separation section 23 are provided inside the communication device 14 and the communication section 22, respectively.

Figure 10:
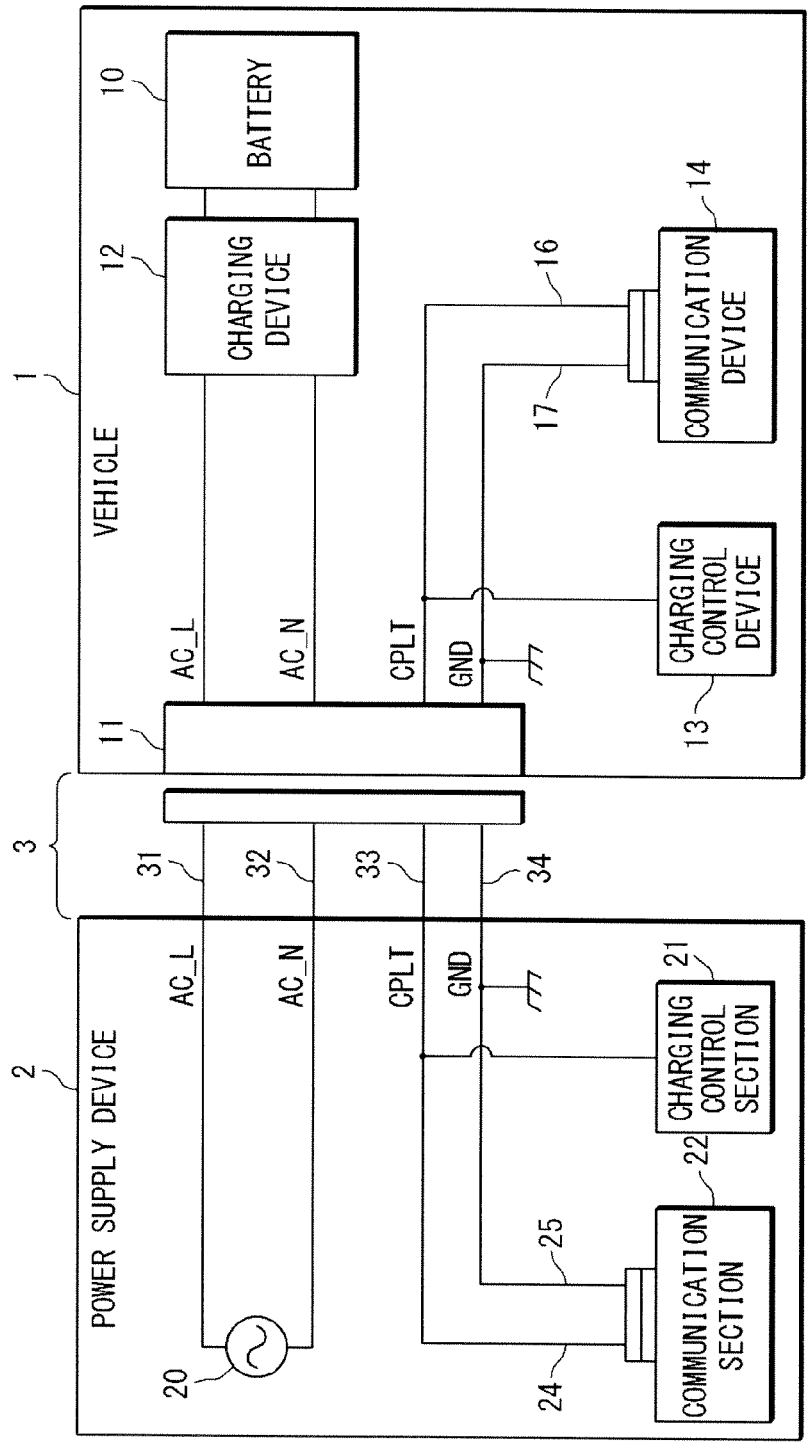
FIG. 10 is an illustrative diagram showing a modification of the communication system according to Embodiment 2.

FIG. 10 is an illustrative diagram showing a modification of the communication system according to Embodiment 2. In FIG. 10, the same components as those shown in FIG. 7 are denoted by the same reference numerals, and detailed description thereof will be omitted.

In the modification shown in FIG. 10, superposition of various communication signals on the control line 33 and the grounding line 34 and separation of superposed various communication signals from the control line 33 and the grounding line 34 are performed in the communication device 14 and the communication section 22. Therefore, the vehicle 1 has the superposition/separation unit 15 provided in the communication device 14 (refer to FIG. 11), and the power supply device 2 has the superposition/separation section 23 provided in the communication section 22 (refer to FIG. 12).

Figure 11:
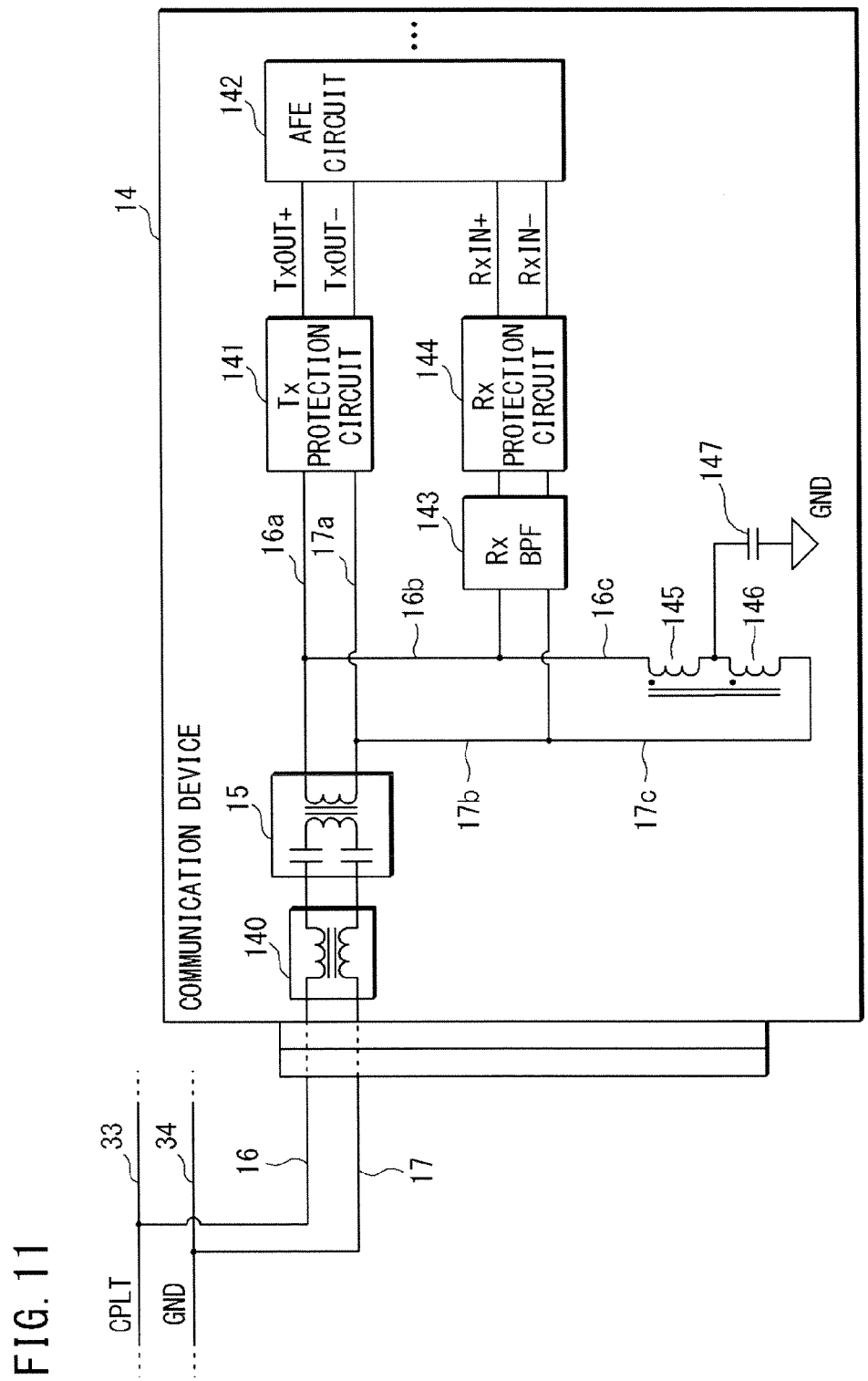
FIG. 11 is a block diagram showing an exemplary configuration of a communication device in the communication system shown in FIG. 10.

FIG. 11 is a block diagram showing an exemplary configuration of the communication device 14 in the communication system shown in FIG. 10. The components shown in FIG. 11 have the same functions as those of the components shown in FIG. 8, and therefore, will be described with the same reference numerals as those shown in FIG. 8 being assigned thereto.

As one of the features of the exemplary configuration shown in FIG. 11, the superposition/separation unit 15 is provided inside the communication device 14. The superposition/separation unit 15 is configured using a circuit such as a coupling transformer and an element such as a capacitor. The coupling transformer includes a first coil connected to the common mode choke coil 140 side via capacitors, and a second coil electromagnetically coupled to the first coil and connected to the transmission protection circuit 141 via the branch lines 16*a* and 17*a*. As described above, the capacitors included in the superposition/separation unit 15 transmit signals in the frequency band used for the communication signal, and block signals in the frequency hand used for the control signal such as a control pilot signal.

The superposition/separation unit 15 superposes various communication signals output from the transmission protection circuit 141 on the control line 33 and the grounding line 34 through the communication lines 16 and 17, and inputs various communication signals separated from the control line 33 and the grounding line 34 to the reception protection circuit 144 via the bandpass filter 143. This configuration allows the communication device 14 to realize inband communication with the power supply device 2 by using the control line 33 and the grounding line 34 as media.

Figure 12:
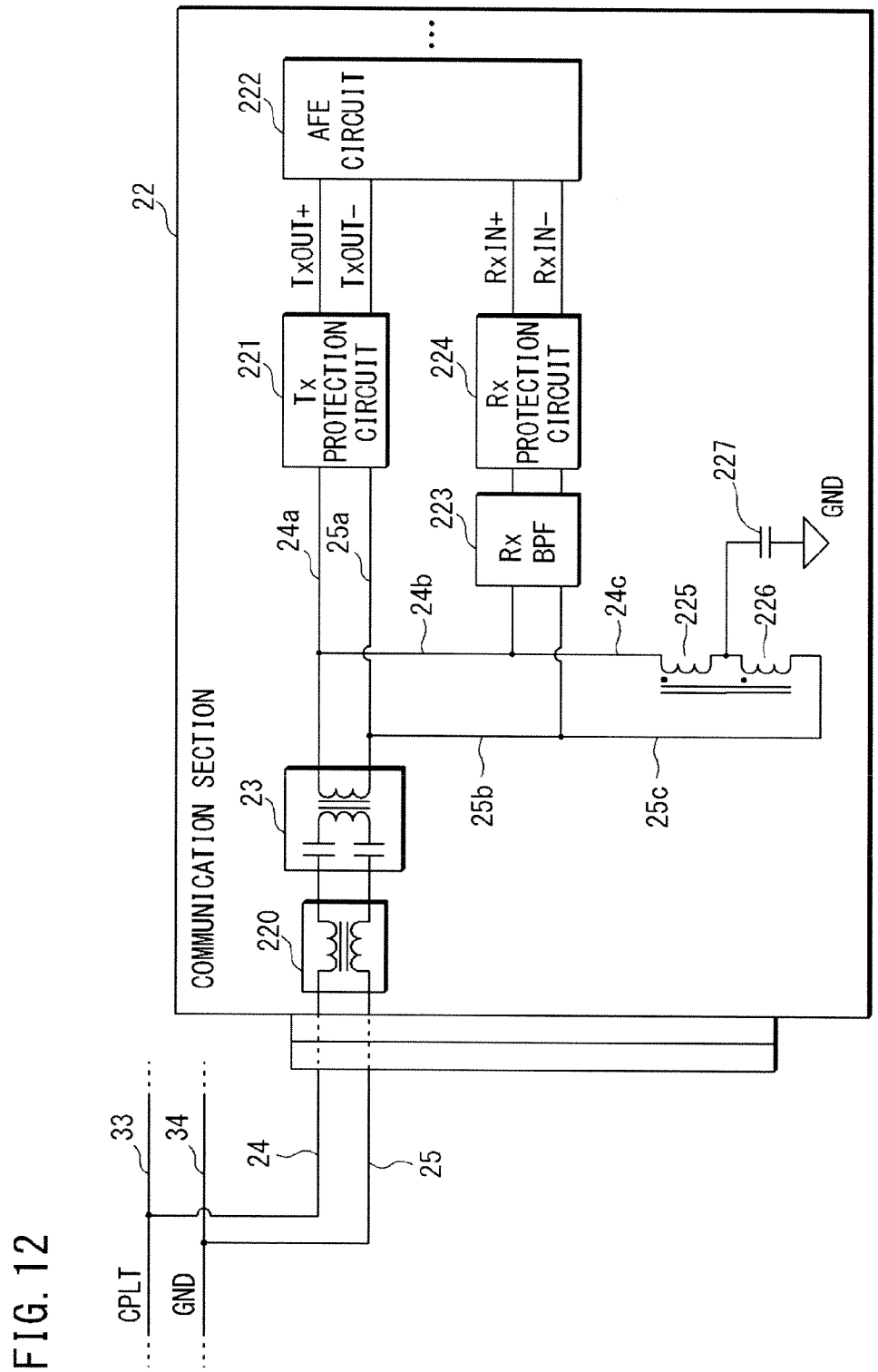
FIG. 12 is a block diagram showing an exemplary configuration of a communication section in the communication system shown in FIG. 10.

FIG. 12 is a block diagram showing an exemplary configuration of the communication section 22 in the communication system shown in FIG. 10. The components shown in FIG. 12 have the same functions as those of the components shown in FIG. 9, and therefore, will be described with the same reference numerals as those shown in FIG. 9 being assigned thereto.

As one of the features of the exemplary configuration shown in FIG. 12, the superposition/separation section 23 is provided inside the communication section 22. The superposition/separation section 23 is configured using a circuit such as a coupling transformer and an element such as a capacitor. The coupling transformer includes a first coil connected to the common mode choke coil 220 side via capacitors, and a second coil electromagnetically coupled to the first coil and connected to the transmission protection circuit 221 via the branch lines 24*a* and 25*a*. As described above, the capacitors included in the superposition/separation section 23 transmit signals in the frequency band used for the communication signal, and block signals in the frequency band used for the control signal such as a control pilot signal.

The superposition/separation section 23 superposes various communication signals output from the transmission protection circuit 221 on the control line 33 and the grounding line 34 through the communication lines 24 and 25, and inputs various communication signals separated from the control line 33 and the grounding line 34 to the reception protection circuit 224 via the bandpass filter 223. This configuration allows the communication section 22 to realize inband communication with the vehicle 1 by using the control line 33 and the grounding line 34 as media.

In the modifications shown in FIGS. 10 to 12, since the common mode noise can be attenuated also by the coupling transformers of the superposition/separation unit 15 and the superposition/separation section 23, the resistance to the common mode noise can be further increased.

In addition, since conversion of the common mode noise outside the communication device 14 (communication section 22) into normal mode noise can be suppressed by enhancing the balancing of the communication lines 16 and 17 (communication lines 24 and 25), the effect of the present invention can be more enhanced. As an exemplary configuration of the communication lines 16 and 17 (communication lines 24 and 25), a twisted pair wire, two parallel wires, coaxial wires, or the like may be adopted. In order to enhance the balancing, a twisted pair wire is most preferable.

Figure 13:
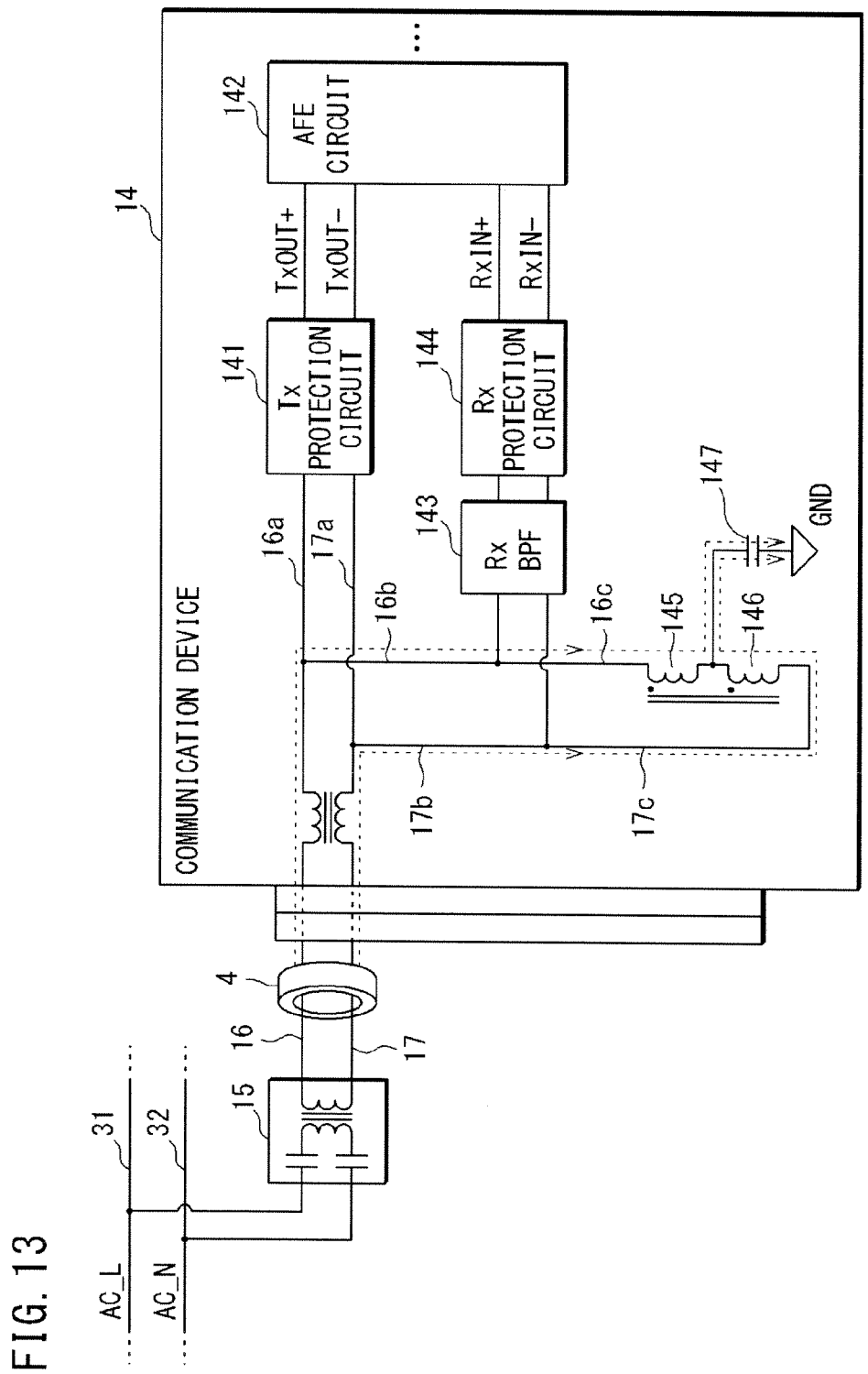
FIG. 13 is an illustrative diagram showing an example of an evaluation test for common mode noise of a device used in the communication system of the present invention.

Next, an evaluation test for common mode noise of a device used in the communication system of the present invention will be described. FIG. 13 is an illustrative diagram showing an example of an evaluation test for common mode noise of a device used in the communication system of the present invention. FIG. 13 shows a system for executing an evaluation test on the communication device 14 included in the vehicle 1 that performs the inband communication described with reference to FIG. 8 in Embodiment 2. The evaluation test shown in FIG. 13 adopts a system for executing a BCI test, and evaluates influence of common mode noise by measuring voltage values in the communication device 14.

In the evaluation test shown in FIG. 13, the pair of communication lines 16 and 17 are inserted in a current probe 4, and the current probe 4 is caused to generate pseudo common mode noise. The generated common mode noise enters the communication device 14 from the current probe 4 side, as shown by dashed arrows in FIG. 13. In the communication device 14 of the present invention, however, the common node noise does not flow toward the reception protection circuit 144 side but flows toward the ground side through the pair of induction elements 145 and 146 and the capacitance element 147. In order to verify such an effect, voltage values (RxIN+ and RxIN−) applied to the pair of connection lines that connect the reception protection circuit 144 and the AFE circuit 142 are measured, and thus influence of the common mode noise that enters the communication device 14 is evaluated.

Figure 14:
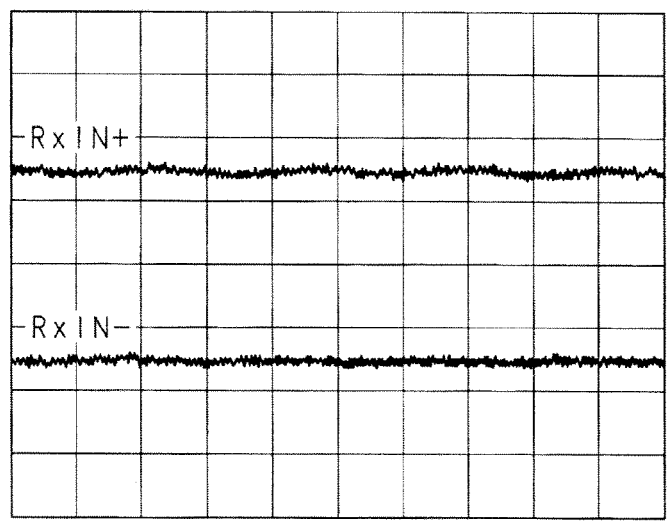
FIG. 14 is a graph showing an example of a result of the evaluation test for common mode noise of the device used in the communication system of the present invention.

FIG. 14 is a graph showing an example of a result of the evaluation test for the common mode noise of the device used in the communication system of the present invention. FIG. 14 shows the result of the evaluation test executed by the method shown in FIG. 13, as time-dependent changes of the voltage values (RxIN+ and RxIN−) applied to the pair of connection lines. As shown in FIG. 14, the voltage values having waveforms of the same phase simulate the common mode noise that enters the AFE circuit 142 and its influence.

Figure 22:
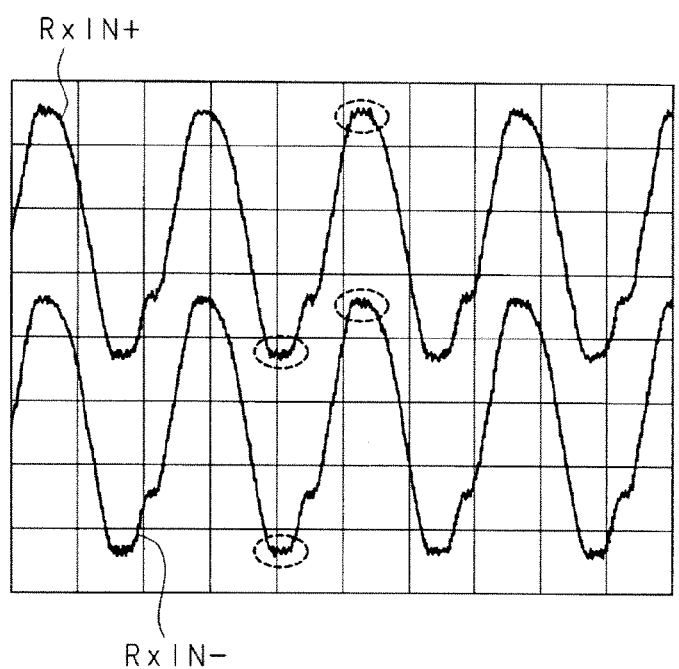
FIG. 22 is a graph showing an example of a result of the evaluation test for common mode noise.

As shown in FIG. 14, both the voltage values (RxIN+ and RxIN−) applied to the pair of connection lines have substantially flat waveforms. This indicates that the pseudo common mode noise generated in the current probe 4 flows through the pair of induction elements 145 and 146 and thereby is sufficiently attenuated, and does not enter the AFE circuit 142. When the graph of FIG. 14 is compared to the graph of FIG. 22 showing the result of the test on the conventional system, it is obvious that the device such as the communication device 14 used in the communication system of the present invention provides a remarkable effect in terms of attenuation of the common mode noise.

Since the peak of the waveform due to the common mode noise is small as shown in FIG. 14, the amplitude is not suppressed by a clipping diode incorporated in the reception protection circuit 144. Therefore, suppression of the communication signal can also be prevented. Accordingly, it is possible to prevent occurrence of communication abnormality such as communication interruption due to partial disappearance of the communication signal.

The above-mentioned embodiments are merely disclosure of part of infinite number of examples of the present invention, and can be appropriately designed by adding various factors such as the purpose, usage, mode, and the like. For example, a pair of induction elements having a low impedance to common mode noise may be connected, not to a pair of branch lines connected to a reception side circuit, but to a pair of communication lines before branching to the transmission side and the reception side.

Figure 15:
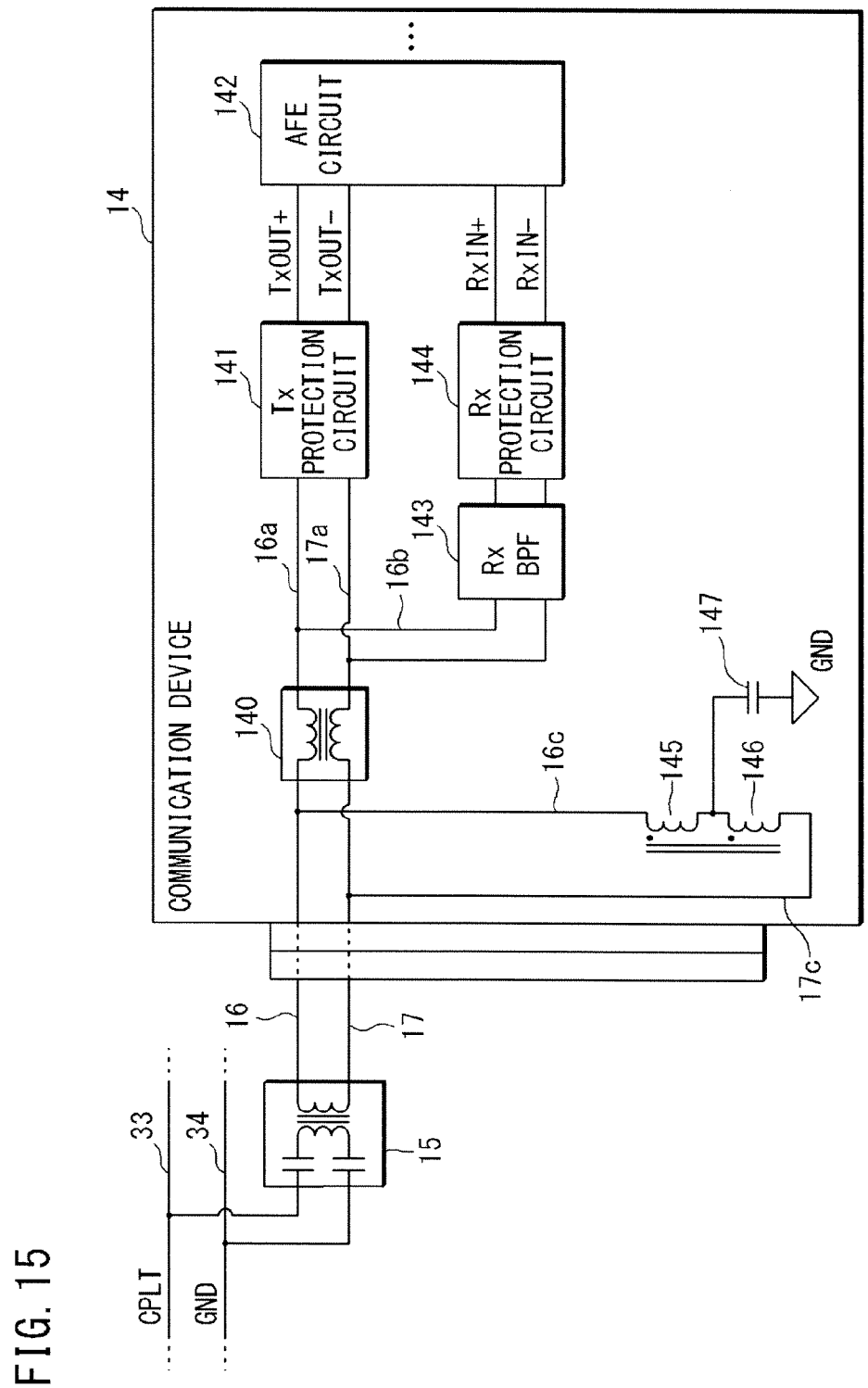
FIG. 15 is a block diagram showing an exemplary configuration of a communication device used in a communication system according to another embodiment of the present invention.
Figure 16:
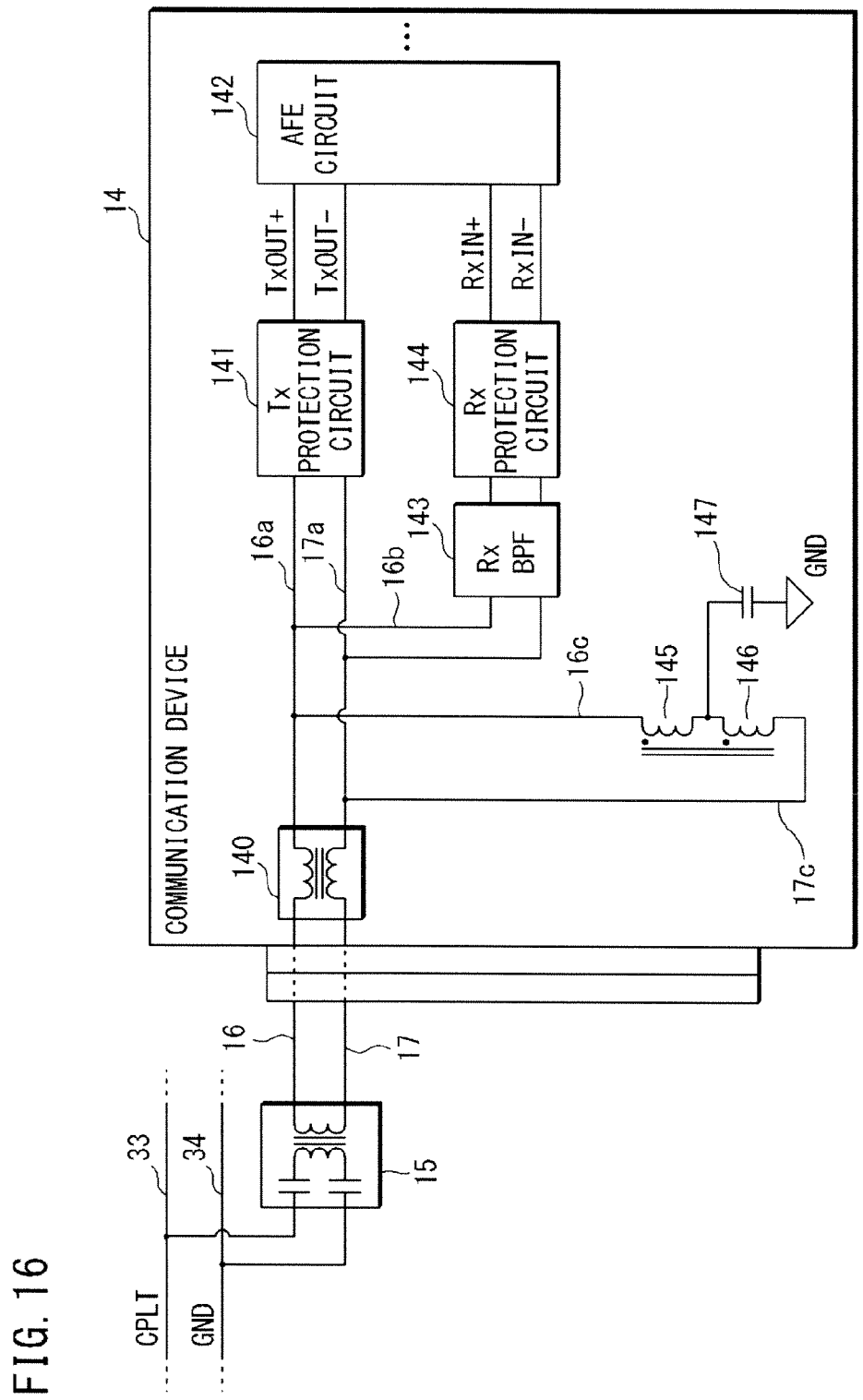
FIG. 16 is a block diagram showing an exemplary configuration of a communication device used in a communication system according to another embodiment of the present invention.
Figure 17:
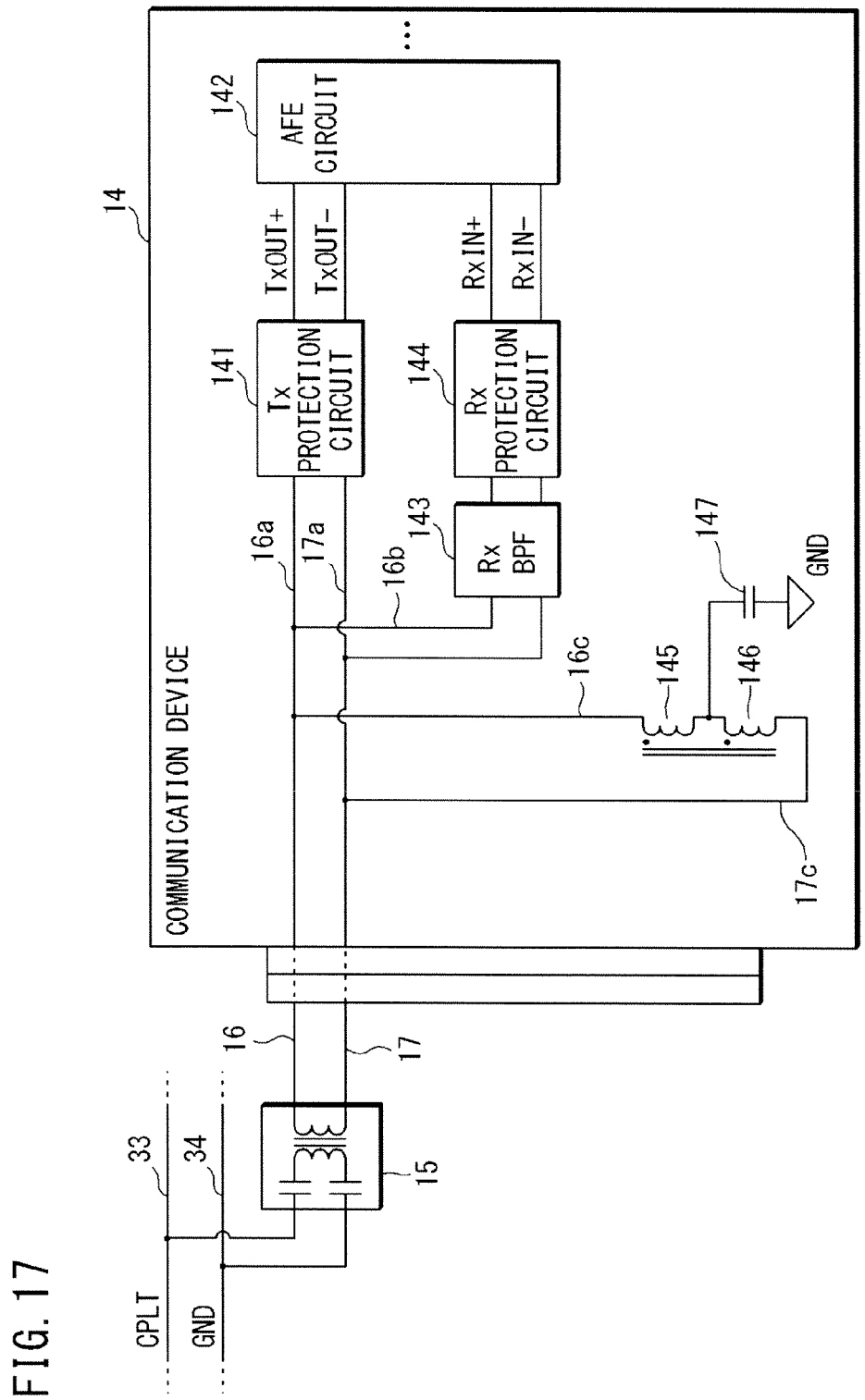
FIG. 17 is a block diagram showing an exemplary configuration of a communication device used in a communication system according to another embodiment of the present invention.

FIGS. 15, 16, and 17 are block diagrams showing exemplary configurations of communication devices used in communication systems according to other embodiments of the present invention. FIGS. 15, 16, and 17 each show an example in which the communication device 14 of the vehicle 1 performing inband communication, which is described as Embodiment 2, is developed to another embodiment. FIGS. 15, 16, and 17 each show a configuration in which a pair of branch lines 16c and 17c are connected between the superposition/separation unit 15 and the branch points to the transmission side and the reception side, in the pair of communication lines 16 and 17 of the communication device 14 shown in FIG. 8. One ends of the pair of induction elements 145 and 146 are connected to the pair of branch lines 16c and 17c, and the other ends of the pair of induction elements 145 and 146 are connected to the ground potential via the capacitance element 147.

FIG. 15 shows a case in which the pair of communication lines 16 and 17 branch between the superposition/separation unit 15 and the common mode choke coil 140, and the pair of induction elements 145 and 146 are connected thereto. FIG. 16 shows a case in which the pair of communication lines 16 and 17 branch between the common mode choke coil 140 and the branch points to the transmission side and the reception side, and the pair of induction elements 145 and 146 are connected thereto. FIG. 17 shows a case in which the common mode choke coil 140 is omitted. Even if the common mode choke coil 140 is not provided as shown in FIG. 17, since the common mode noise is attenuated by the pair of induction elements 145 and 146, it is possible to prevent occurrence of communication abnormality.

The exemplary configurations shown in FIGS. 15, 16, and 17 may be applied to power line communication, or may be applied to the communication section 22 of the power supply device 2.

In the communication devices 14 according to Embodiments 1 and 2, the capacitance element 147 is interposed between the pair of induction elements 145 and 146 and the ground potential. However, the position where the capacitance element 147 is interposed is not limited to the position between the pair of induction elements 145 and 146 and the ground potential.

Figure 18:
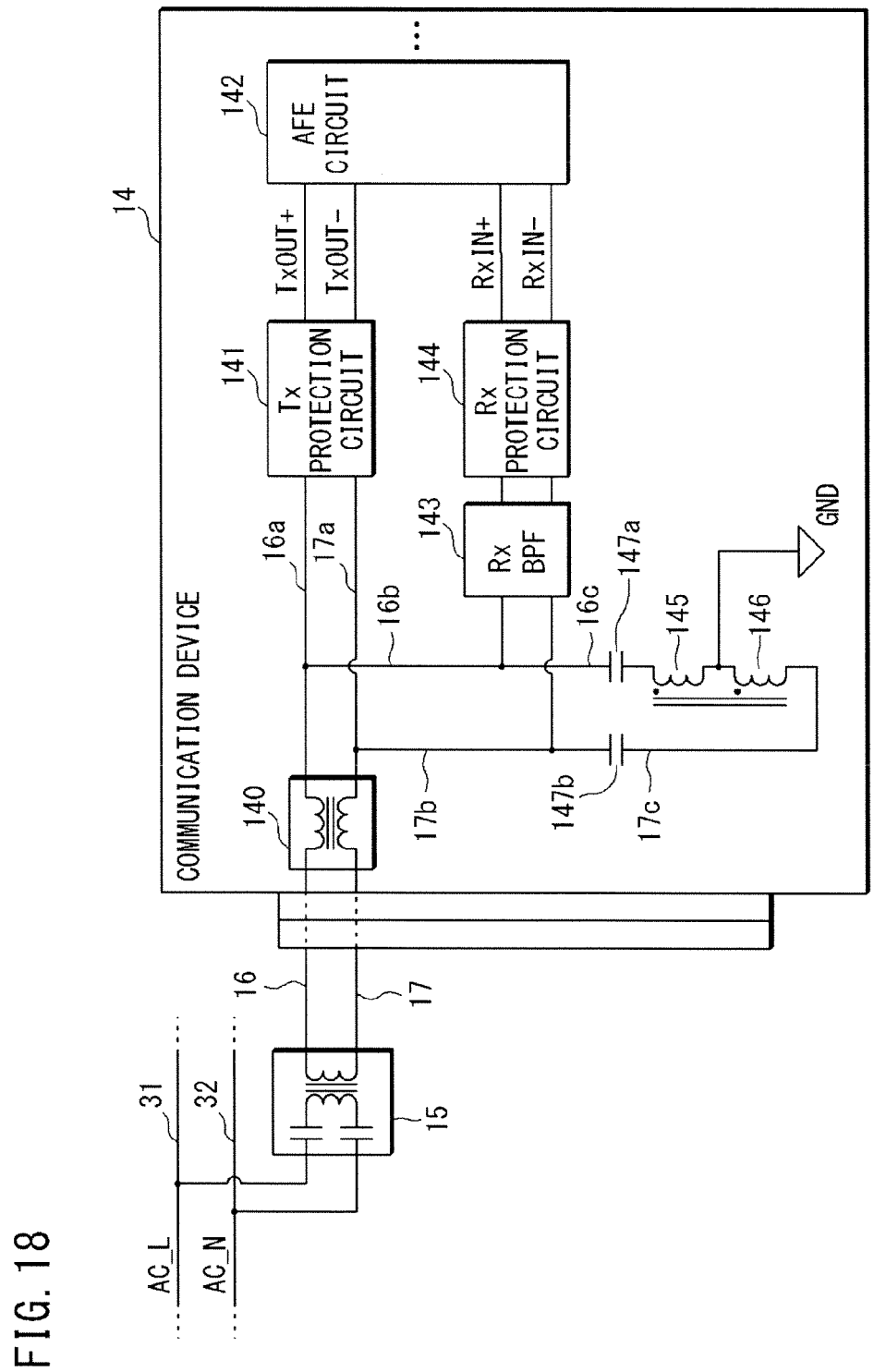
FIG. 18 is a block diagram showing a modification of the communication device.
Figure 19:
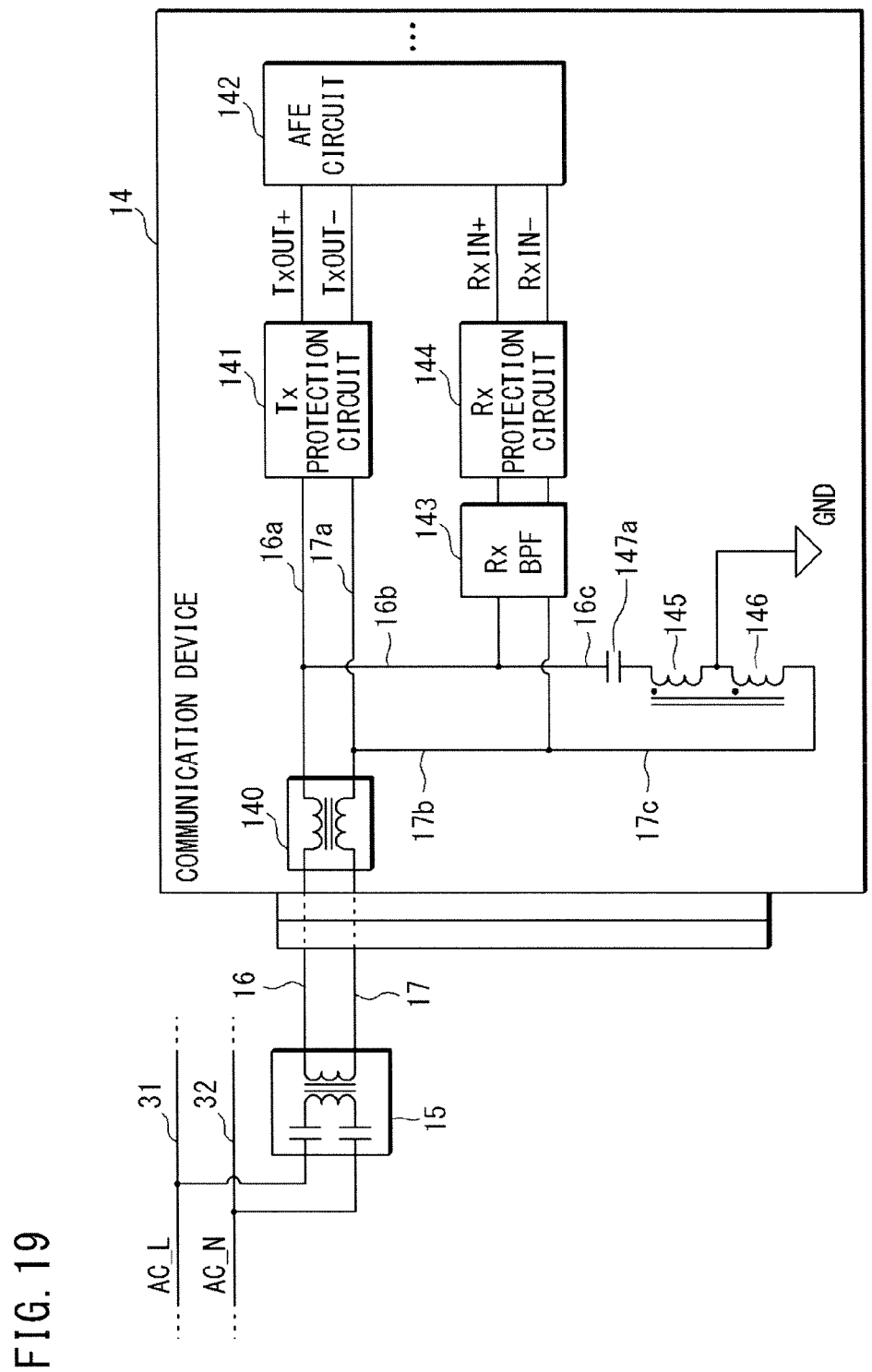
FIG. 19 is a block diagram showing a modification of the communication device.
Figure 20:
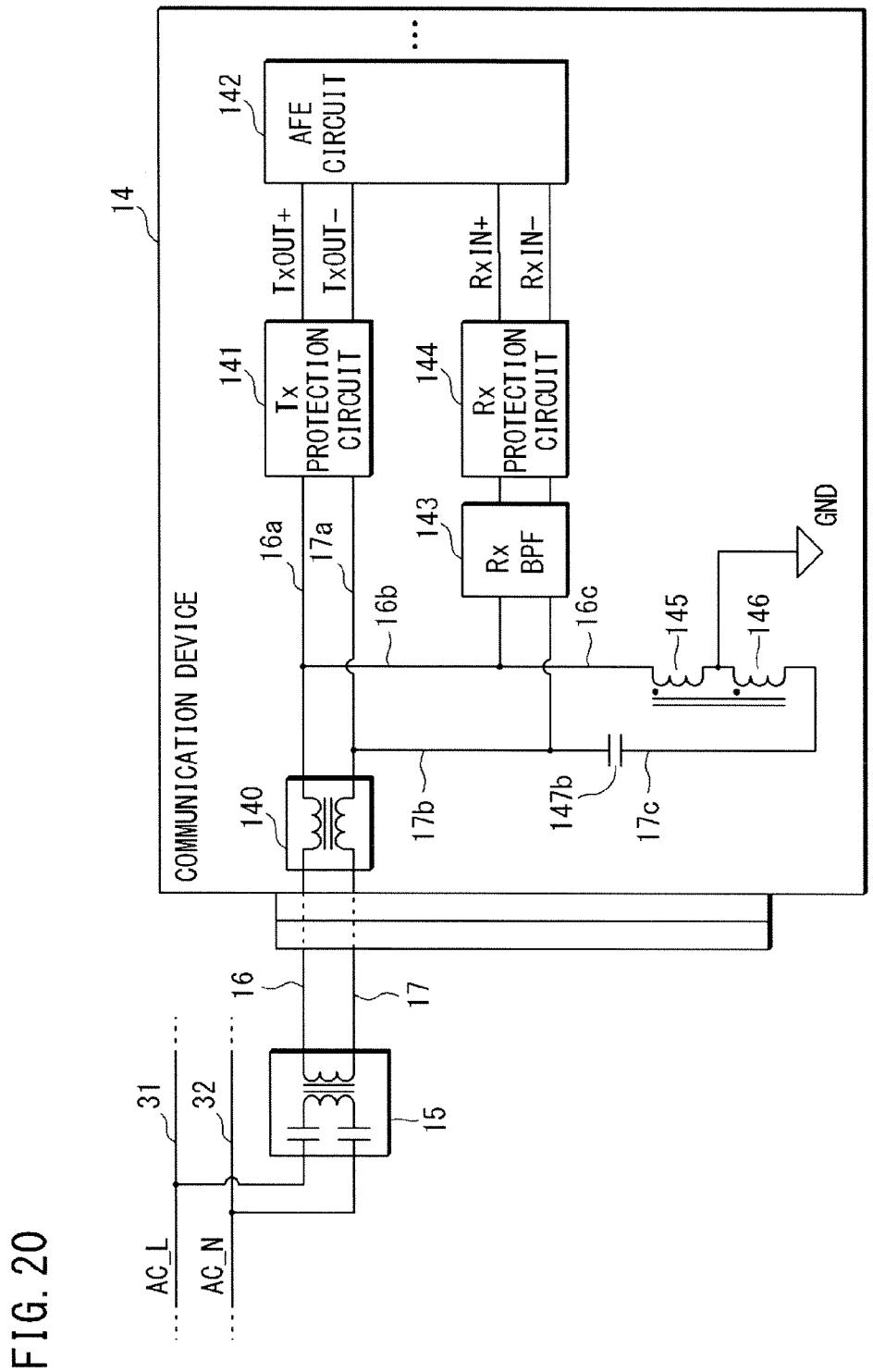
FIG. 20 is a block diagram showing a modification of the communication device.
Figure 21:
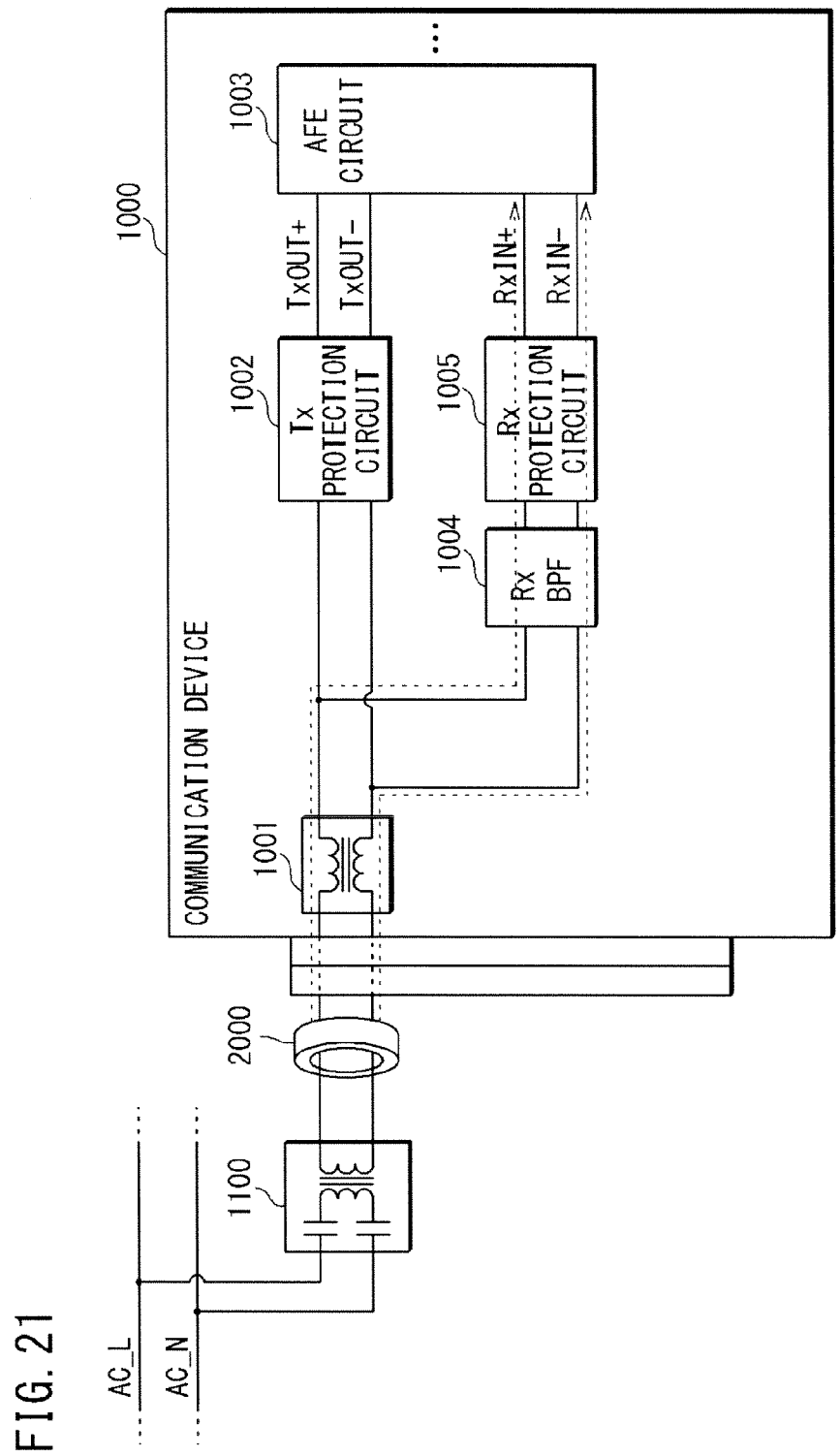
FIG. 21 is an illustrative diagram showing an example of an evaluation test for common mode noise of a communication device.

FIGS. 18, 19, and 20 are block diagrams showing modifications of the communication device 14. FIGS. 18, 19, and 20 each show an example in which the position where the capacitance element 147 is interposed is changed in the communication device 14 shown in FIG. 2. In FIG. 18, a capacitance element 147a such as a capacitor is interposed between one end of the one dielectric element 145 and the communication line 16 (branch line 16a), and further, a capacitance element 147b such as a capacitor is interposed between one end of the other dielectric element 146 and the communication line 17 (branch line 17a).

Likewise, in FIG. 19, a capacitance element 147a is interposed between one end of the one dielectric element 145 and the communication line 16 (branch line 16a). In FIG. 20, a capacitance element 147b is interposed between one end of the other dielectric element 146 and the communication line 17 (branch line 17a).

While the modifications of the communication device 14 shown in FIG. 2 have been described with reference to FIGS. 18, 19, and 20, the communication devices 14 shown in FIGS. 5, 8, 11, and 15 to 17 may also be configured to change the position where the capacitance element 147 is interposed. Further, not only the communication device 14 provided in the vehicle 1 but also the communication section 22 of the power supply device 2 shown in FIGS. 3, 6, 9, and 12 may be configured to change the position where the capacitance element 147 is interposed.

REFERENCE SIGNS LIST 1 vehicle
10 battery (power storage device)
11 power receiving connector
12 charging device
13 charging control device
14 communication device
140 common mode choke coil
141 transmission protection circuit
142 AFE circuit
143 bandpass filter
144 reception protection circuit
145, 146 induction element
147 capacitance element
15 superposition/separation unit
16, 17 communication line
16a, 17a, 16b, 17b, 16c, 17c branch line
2 power supply device (communication device)
20 power supply section
21 charging control section
22 communication section (communication device)
220 common mode choke coil
221 transmission protection circuit
222 AFE circuit
223 bandpass filter
224 reception protection circuit
225, 226 induction element
227 capacitance element
23 superposition/separation section
24, 25 communication line
24a, 25a, 24b, 25b, 24c, 25c branch line
3 charging cable
31, 32 power supply line
33 control line
34 grounding line

The invention claimed is:

1. A communication device, included in either a vehicle or a power supply device, in a communication system, the communication system configured such that a communication signal is transmitted and received using a pair of power supply lines, the power supply lines connecting the vehicle having a power storage device to the power supply device for supplying power to the power storage device, the communication device including:
a pair of communication lines which are respectively connected to the pair of power supply lines; and
a pair of induction elements each having one end connected to each of the pair of communication lines, wherein
the other ends of the pair of induction elements are connected to a reference potential.

2. The communication device according to claim 1, further including a transmission side circuit and a reception side circuit each being connected to the pair of communication lines via a pair of branch lines, wherein
the pair of induction elements are connected to the pair of communication lines via the pair of branch lines connected to the reception side circuit.

3. The communication device according to claim 1, further including a capacitance element interposed between the other ends of the pair of induction elements and the reference potential.

4. The communication device according to claim 1, further including a capacitance element interposed in at least one of two lines between the pair of communication lines and the one ends of the pair of induction elements.

5. The communication device according to claim 1, wherein the pair of induction elements are a pair of coils having substantially the same number of turns.

6. The communication device according to claim 1, wherein a superposition/separation unit which superposes and separates a communication signal via the pair of communication lines, is connectable.

7. The communication device according to claim 1, wherein the pair of communication lines is a twisted pair wire.

8. A communication device, included in either a vehicle or a power supply device, in a communication system, the communication system configured such that a communication signal different from a control signal used for power supply control is transmitted and received using a control line for transmitting the control signal and a grounding line, the control line and the grounding line connecting the vehicle having a power storage device to the power supply device for supplying power to the power storage device, the communication device including:
a pair of communication lines which are respectively connected to the control line and the grounding line; and
a pair of induction elements each having one end connected to each of the pair of communication lines, wherein
the other ends of the pair of induction elements are connected to a reference potential.

9. The communication device according to claim 8, further including a transmission side circuit and a reception side circuit each being connected to the pair of communication lines via a pair of branch lines, wherein
the pair of induction elements are connected to the pair of communication lines via the pair of branch lines connected to the reception side circuit.

10. The communication device according to claim 8, further including a capacitance element interposed between the other ends of the pair of induction elements and the reference potential,
the pair of induction elements are connected to the pair of communication lines via the pair of branch lines connected to the reception side circuit.

11. The communication device according to claim 8, further including a capacitance element interposed in at least one of two lines between the pair of communication lines and the one ends of the pair of induction elements.

12. The communication device according to claim 8, wherein the pair of induction elements are a pair of coils having substantially the same number of turns.

13. The communication device according to claim 8, wherein a superposition/separation unit which superposes and separates a communication signal via the pair of communication lines, is connectable.

14. The communication device according to claim 8, wherein the pair of communication lines is a twisted pair wire.

15. A communication system in which a power supply device is connected to a vehicle via a pair of power supply lines used for power supply, the vehicle having a communication function and including a power storage device supplied with power from the power supply device, and a communication signal is transmitted and received using the power supply line as a medium, wherein
- at least one of the power supply device and the vehicle includes a communication device which performs communication via a pair of communication lines connected to the pair of power supply lines used for power supply, the communication device including a pair of induction elements each having one end connected to each of the pair of communication lines, wherein
- the other ends of the pair of induction elements are connected to a reference potential, and
- the communication device is connected to the pair of power supply lines via the pair of communication lines.

16. A communication system including a power supply device, and a vehicle having a communication function and including a power storage device supplied with power from the power supply device, in which a communication signal different from a control signal used for power supply control is transmitted and received using, as media, a control line for transmitting the control signal, and a grounding line, wherein
- at least one of the power supply device and the vehicle includes a communication device which performs communication via a pair of communication lines connected to the control line and the grounding line, the control line transmitting the control signal used for power supply control, the communication device including a pair of induction elements each having one end connected to each of the pair of communication lines, wherein
- the other ends of the pair of induction elements are connected to a reference potential, and
- the communication device is connected to the control line and the grounding line via the pair of communication lines.

* * * * *